(12) United States Patent
Kamijima

(10) Patent No.: US 10,679,785 B2
(45) Date of Patent: Jun. 9, 2020

(54) COIL COMPONENT AND POWER SUPPLY CIRCUIT UNIT

(71) Applicant: TDK CORPORATION, Tokyo (JP)

(72) Inventor: Akifumi Kamijima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/495,637

(22) Filed: Apr. 24, 2017

(65) Prior Publication Data

US 2017/0316868 A1    Nov. 2, 2017

(30) Foreign Application Priority Data

Apr. 27, 2016   (JP) ................................ 2016-089430

(51) Int. Cl.
| | |
|---|---|
| *H01F 27/28* | (2006.01) |
| *H01F 17/00* | (2006.01) |
| *H02M 3/156* | (2006.01) |
| *H02M 3/155* | (2006.01) |
| *H01F 17/04* | (2006.01) |
| *H01F 27/29* | (2006.01) |

(52) U.S. Cl.
CPC ..... *H01F 27/2804* (2013.01); *H01F 17/0013* (2013.01); *H02M 3/156* (2013.01); *H01F 17/04* (2013.01); *H01F 27/292* (2013.01); *H01F 2017/048* (2013.01); *H01F 2027/2809* (2013.01); *H02M 3/155* (2013.01)

(58) Field of Classification Search
CPC ......... H01F 2027/2809; H01F 17/0013; H01F 17/04; H01F 2017/048; H01F 27/2804; H01F 27/292; H01F 27/00-36; H02M 3/156; H02M 3/155

USPC ................................ 336/200, 206-208, 232
See application file for complete search history.

(56) References Cited

U.S. PATENT DOCUMENTS

| | | | | |
|---|---|---|---|---|
| 6,060,976 | A | * | 5/2000 | Yamaguchi ......... H01F 27/2804 336/200 |
| 6,195,771 | B1 | * | 2/2001 | Tanabe .................. G11C 29/44 365/201 |
| 7,477,127 | B2 | * | 1/2009 | Kamijima ........... H01F 17/0013 336/206 |
| 8,928,449 | B2 | * | 1/2015 | Silva ........................ H01F 3/10 336/200 |

(Continued)

FOREIGN PATENT DOCUMENTS

| | | |
|---|---|---|
| JP | 2014-127718 A | 7/2014 |
| JP | 2015-076606 A | 4/2015 |

(Continued)

*Primary Examiner* — Nguyen Tran
*Assistant Examiner* — Demetries A Gibson
(74) *Attorney, Agent, or Firm* — Oliff PLC

(57) ABSTRACT

Provided is a coil component including a coil portion that has at least one layer of ring-shaped planar coil portion including a coil-wound portion and an insulative resin layer which covers the periphery of the coil-wound portion within the same layer as the coil-wound portion, and an insulative resin layer overlapping the planar coil portion; and a covering portion that covers the coil portion. The insulative resin layer has a superimposing region overlapping a forming region of the planar coil portion and a protrusion region protruding from at least any one of an inner peripheral edge and an outer peripheral edge of the superimposing region, when viewed in the direction of overlapping the planar coil portion.

15 Claims, 16 Drawing Sheets

(56) References Cited

U.S. PATENT DOCUMENTS

| | | | | |
|---|---|---|---|---|
| 2003/0179067 A1* | 9/2003 | Gamou | ............... | H01F 27/2804 336/223 |
| 2005/0068148 A1* | 3/2005 | Yoshida | .............. | H01F 17/0013 336/200 |
| 2008/0197963 A1* | 8/2008 | Muto | ................. | H01F 17/0013 336/200 |
| 2009/0066462 A1* | 3/2009 | Ito | ....................... | H01F 17/0013 336/200 |
| 2012/0319811 A1* | 12/2012 | Chu | ................... | H01F 17/0013 336/200 |
| 2014/0176283 A1 | 6/2014 | Yang et al. | | |
| 2014/0375411 A1* | 12/2014 | Scholz | ............... | H01F 27/2804 336/200 |
| 2015/0097647 A1 | 4/2015 | Lee et al. | | |
| 2015/0332838 A1* | 11/2015 | Blanke | ............... | H01F 27/2804 336/170 |
| 2017/0200554 A1 | 7/2017 | Kudo et al. | | |

FOREIGN PATENT DOCUMENTS

| | | |
|---|---|---|
| JP | 2015-216336 A | 12/2015 |
| JP | 2017-123406 A | 7/2017 |

\* cited by examiner

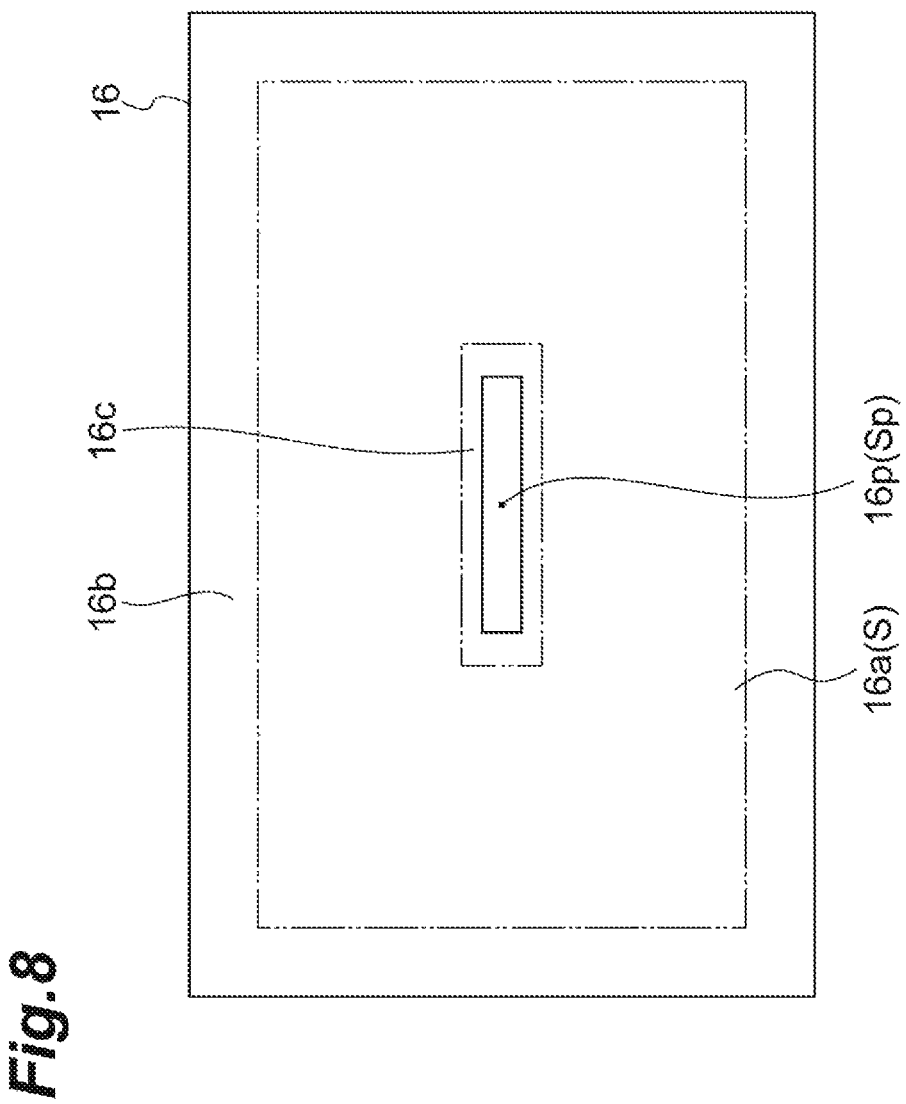

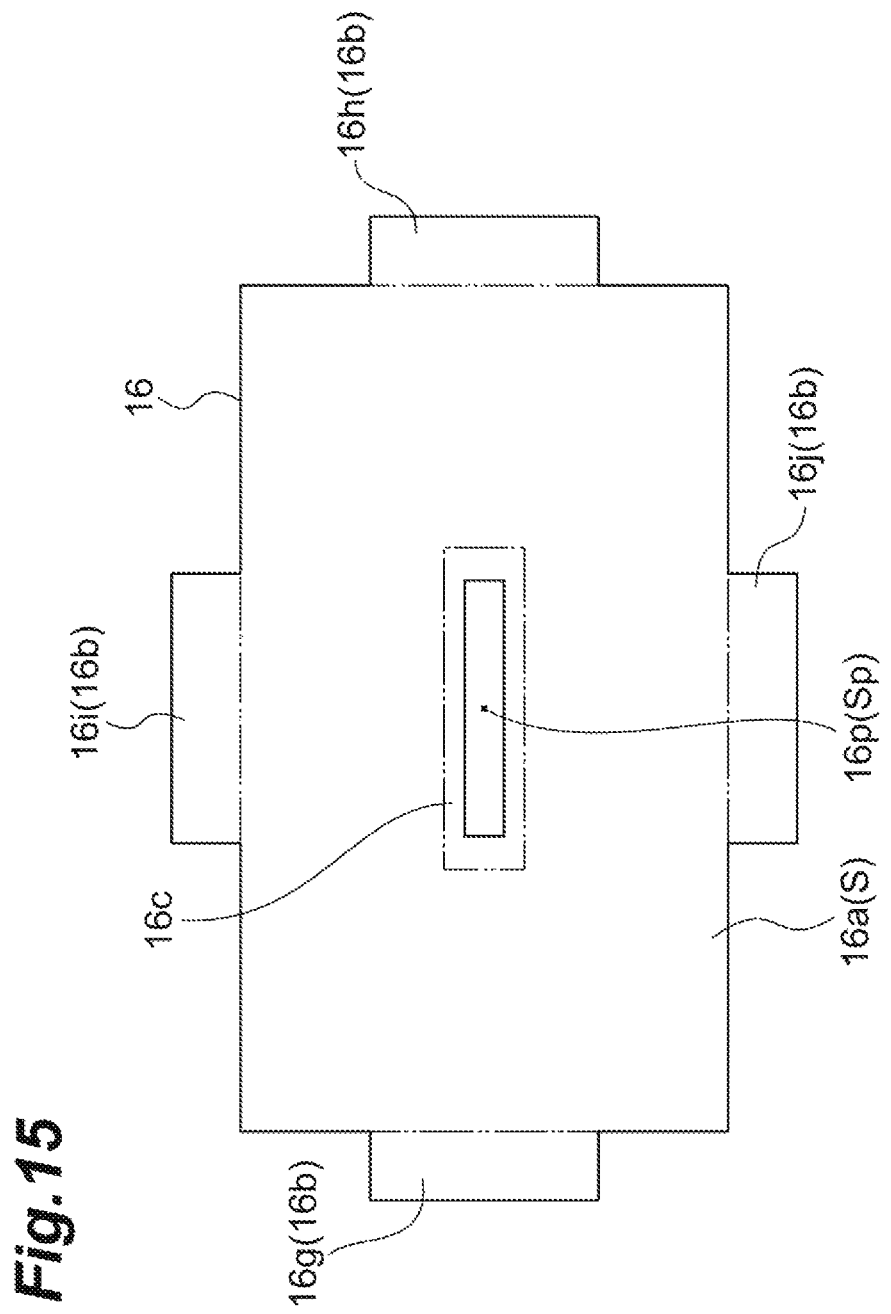

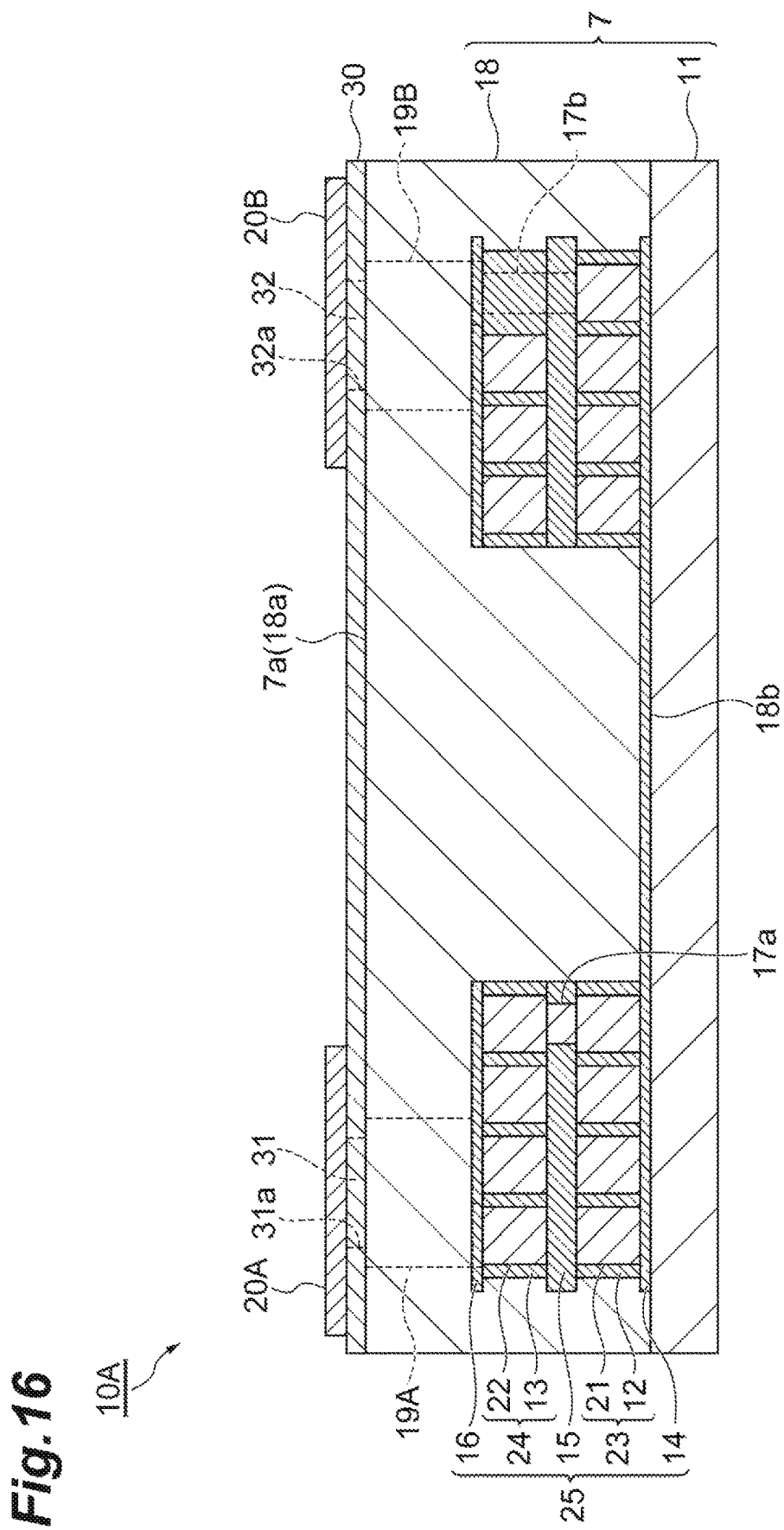

COIL COMPONENT AND POWER SUPPLY CIRCUIT UNIT

CROSS-REFERENCE TO RELATED APPLICATIONS

This application is based upon and claims the benefit of priority from Japanese Patent Application No. 2016-89430, filed on Apr. 27, 2016, the entire contents of which are incorporated herein by reference.

BACKGROUND OF THE INVENTION

Field of the Invention

This disclosure relates to a coil component and a power supply circuit unit.

Related Background Art

For example, as a coil component in the related art, Japanese Unexamined Patent Publication No. 2015-76606 (Patent Literature 1) discloses a coil component provided with a coil portion including a coil-wound portion and an insulative layer which covers the coil-wound portion, within an element body.

In the coil component disclosed in Patent Literature 1, high positional stability of the coil portion within the element body is required. In a coil component having low positional stability of the coil portion within the element body, positional deviation of the coil portion is likely to be caused due to thermal history, vibration, or the like, thereby resulting in a change in inductance.

According to this disclosure, there are provided a coil component in which a change in inductance can be prevented, and a power supply circuit unit.

According to an aspect of this disclosure, there is provided a coil component including a coil portion that has at least one layer of ring-shaped planar coil portion including a coil-wound portion and an intra insulative layer which covers the periphery of the coil-wound portion within the same layer as the coil-wound portion, and an extra insulative layer overlapping the planar coil portion; and a covering portion that covers the coil portion. The extra insulative layer has a superimposing region overlapping a forming region of the planar coil portion and a protrusion region protruding from at least any one of an inner peripheral edge and an outer peripheral edge of the superimposing region, when viewed in a direction of overlapping the planar coil portion.

In the coil component, the extra insulative layer in the coil portion has the protrusion region protruding from at least any one of the inner peripheral edge and the outer peripheral edge of the superimposing region, in addition to the superimposing region overlapping the forming region of the planar coil portion. Therefore, in the extra insulative layer, the contact area with respect to the covering portion covering the coil portion is widened as much as the protrusion region. Besides, in the extra insulative layer, a portion of the protrusion region extends in such a manner as to enter the covering portion, thereby intruding into the covering portion. Accordingly, adhesion of the extra insulative layer with respect to the covering portion is improved. Therefore, positional stability of the coil portion within the covering portion is improved. Thus, positional deviation of the coil portion caused within the covering portion due to thermal history, vibration, or the like can be prevented. As a result, a change in inductance can be prevented.

In the coil component according to the aspect of this disclosure, when viewed in the direction of overlapping the planar coil portion, the forming region of the planar coil portion may be symmetrical in shape and the protrusion region may be symmetrical in shape in regard to the center of the forming region. In this case, the protrusion region is symmetrically formed based on the center of the symmetrically-shaped forming region of the planar coil portion. Therefore, bias of stress caused within the covering portion due to thermal history, vibration, or the like is equalized. Accordingly, positional stability of the coil portion within the covering portion is further improved.

In the coil component according to the aspect of this disclosure, when viewed in the direction of overlapping the planar coil portion, the protrusion region may protrude from the inner peripheral edge of the superimposing region in its entirety. In this case, compared to a case where the protrusion region partially protrudes from the inner peripheral edge of the superimposing region, the contact area of the extra insulative layer with respect to the covering portion is further widened. Accordingly, adhesion of the extra insulative layer with respect to the covering portion is further improved. Thus, positional stability of the coil portion within the covering portion is further improved.

In the coil component according to the aspect of this disclosure, when viewed in the direction of overlapping the planar coil portion, the protrusion region may protrude from the outer peripheral edge of the superimposing region in its entirety. In this case, compared to a case where the protrusion region partially protrudes from the outer peripheral edge of the superimposing region, the contact area of the extra insulative layer with respect to the covering portion is further widened. Accordingly, adhesion of the extra insulative layer with respect to the covering portion is further improved. Thus, positional stability of the coil portion within the covering portion is further improved.

In the coil component according to the aspect of this disclosure, the coil portion may have a plurality layers of the planar coil portions and a plurality layers of the extra insulative layers respectively overlapping the planar coil portions. In the plurality layers of extra insulative layers, a part of the extra insulative layers may have the superimposing region and the protrusion region, and the remaining extra insulative layers may have the superimposing region and no protrusion region. In this case, the protrusion region is selectively provided in only an extra insulative layer of which adhesion with respect to the covering portion is desired to be improved. In addition, since the coil portion has the plurality layers of planar coil portions, the number of times of winding in the coil portion increases, and it is possible to obtain a coil component having high inductance.

In the coil component according to the aspect of this disclosure, the covering portion may have a substrate in which the coil portion is formed. In the plurality layers of extra insulative layers, an extra insulative layer farthest from the substrate may have the superimposing region and the protrusion region. The extra insulative layer farthest from the substrate is likely to positionally deviate due to thermal history, vibration, or the like, compared to extra insulative layers closer to the substrate. The positional deviation of the extra insulative layer farthest from the substrate is prevented by providing the protrusion region in the extra insulative layer. Accordingly, positional stability of the coil portion within the covering portion is effectively improved.

In the coil component according to the aspect of this disclosure, the coil portion may have a plurality layers of the planar coil portions and a plurality layers of the extra insulative layers respectively overlapping the planar coil portions. All of the plurality layers of extra insulative layers may have the superimposing region and the protrusion region. In this case, in all of the plurality layers of extra insulative layers, adhesion with respect to the covering portion is improved. Therefore, positional stability of the coil portion within the covering portion is further improved. In addition, since the coil portion has the plurality layers of planar coil portions, the number of times of winding in the coil portion increases, and it is possible to obtain a coil component having high inductance.

According to another aspect of this disclosure, there is provided a power supply circuit unit including the coil component described above. According to such a power supply circuit unit, a change in inductance caused due to thermal history, vibration, or the like can be prevented.

BRIEF DESCRIPTION OF THE DRAWINGS

FIG. 8 is a top view illustrating a superimposing region and a protrusion region of further another insulative resin layer illustrated in FIG. 3.

FIG. 15 is a top view illustrating a superimposing region and a protrusion region of further another insulative resin layer illustrated in FIG. 12.

FIG. 16 is a sectional view of a coil component according to further another aspect.

DESCRIPTION OF THE PREFERRED EMBODIMENT

Hereinafter, an embodiment of this disclosure will be described in detail with reference to the accompanying drawings. In the description, the same reference signs are assigned to the same elements or elements having the same functions, and duplicated description will be omitted.

Figure 1:
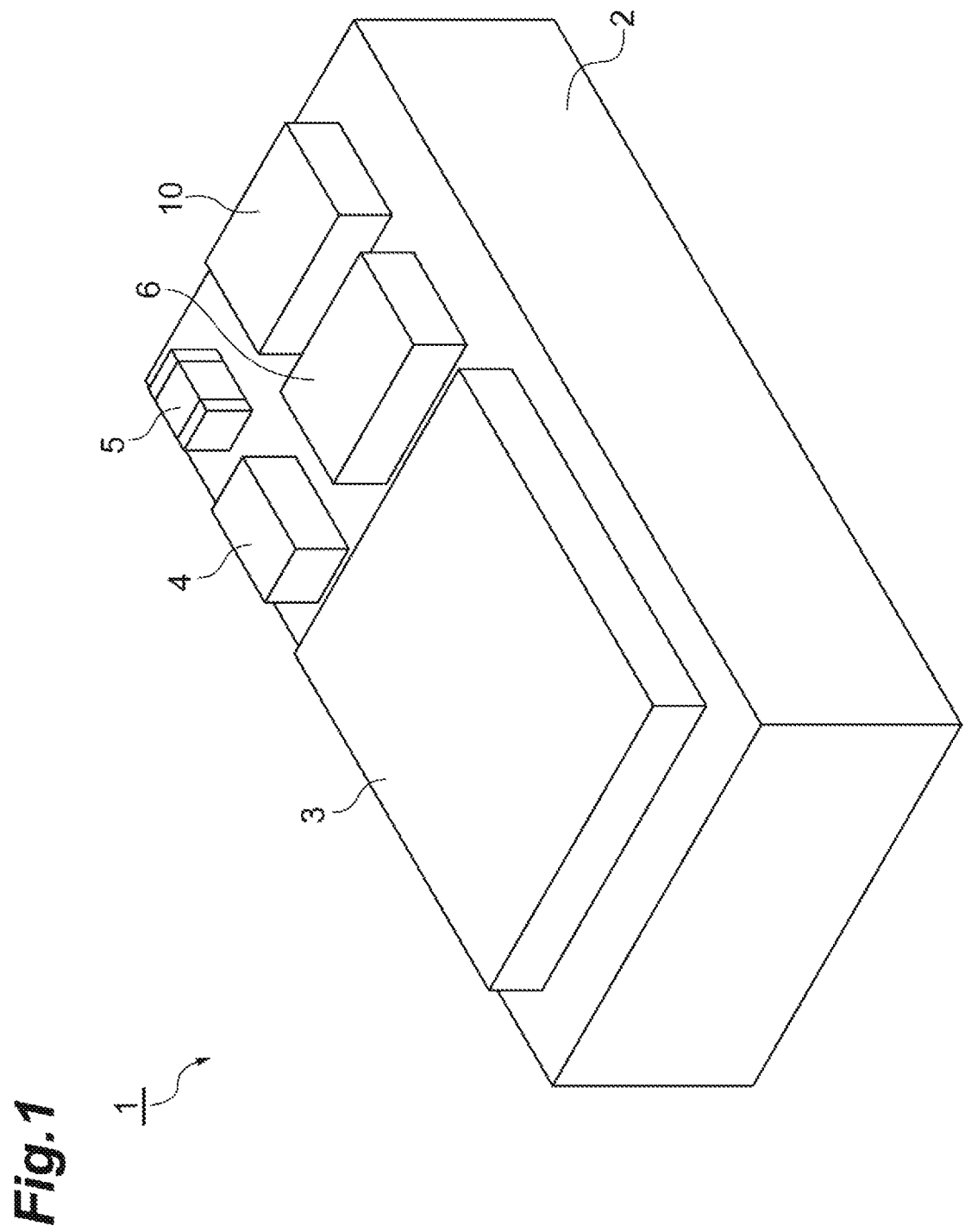
FIG. 1 is a perspective view illustrating a power supply circuit unit according to an embodiment of this disclosure.
Figure 2:
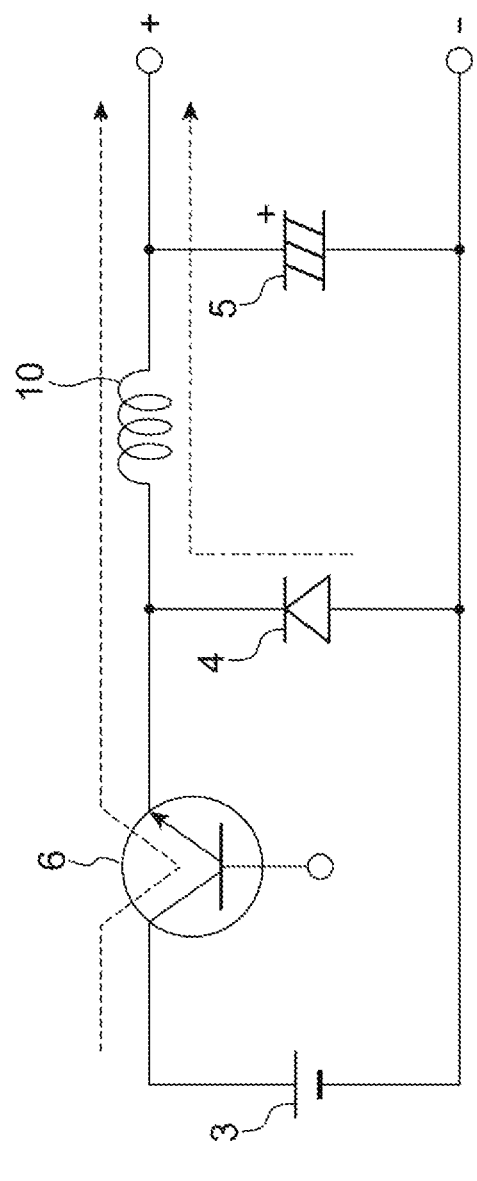
FIG. 2 is a view illustrating an equivalent circuit of the power supply circuit unit illustrated in FIG. 1.

First, with reference to FIGS. 1 and 2, the entire configuration of a power supply circuit unit 1 according to the embodiment of the present invention will be described. For example, a power supply circuit unit to be described in the present embodiment is a switching power supply circuit unit that converts (steps down) a direct voltage. As illustrated in FIGS. 1 and 2, the power supply circuit unit 1 includes a circuit substrate 2 and electronic components 3, 4, 5, 6, and 10. Specifically, a power supply IC 3, a diode 4, a capacitor 5, a switching element 6, and a coil component 10 are configured to be mounted on the circuit substrate 2.

Figure 3:
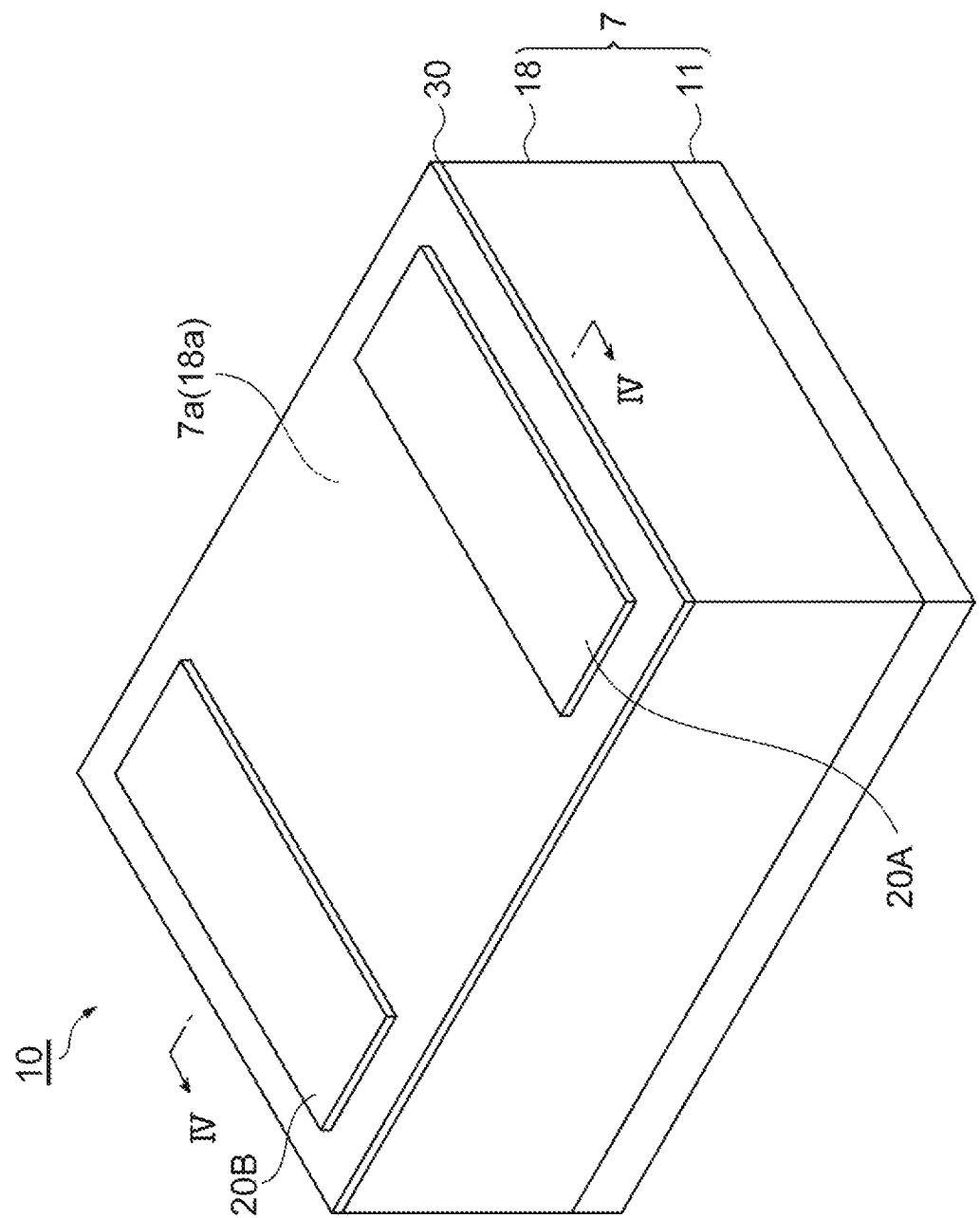
FIG. 3 is a perspective view of a coil component according to the embodiment of this disclosure.
Figure 4:
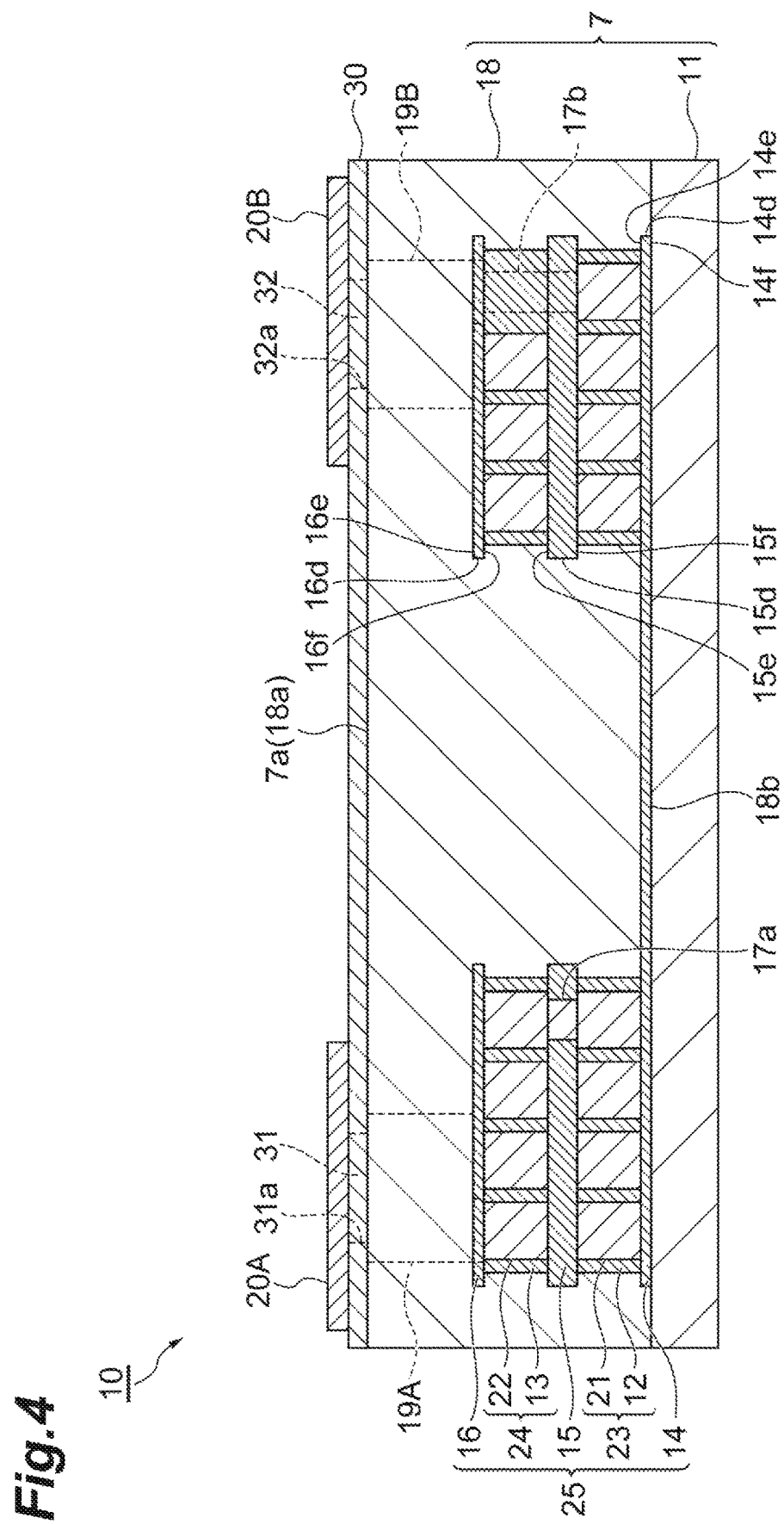
FIG. 4 is a sectional view of the coil component in FIG. 3 taken along line IV-IV.
Figure 5:
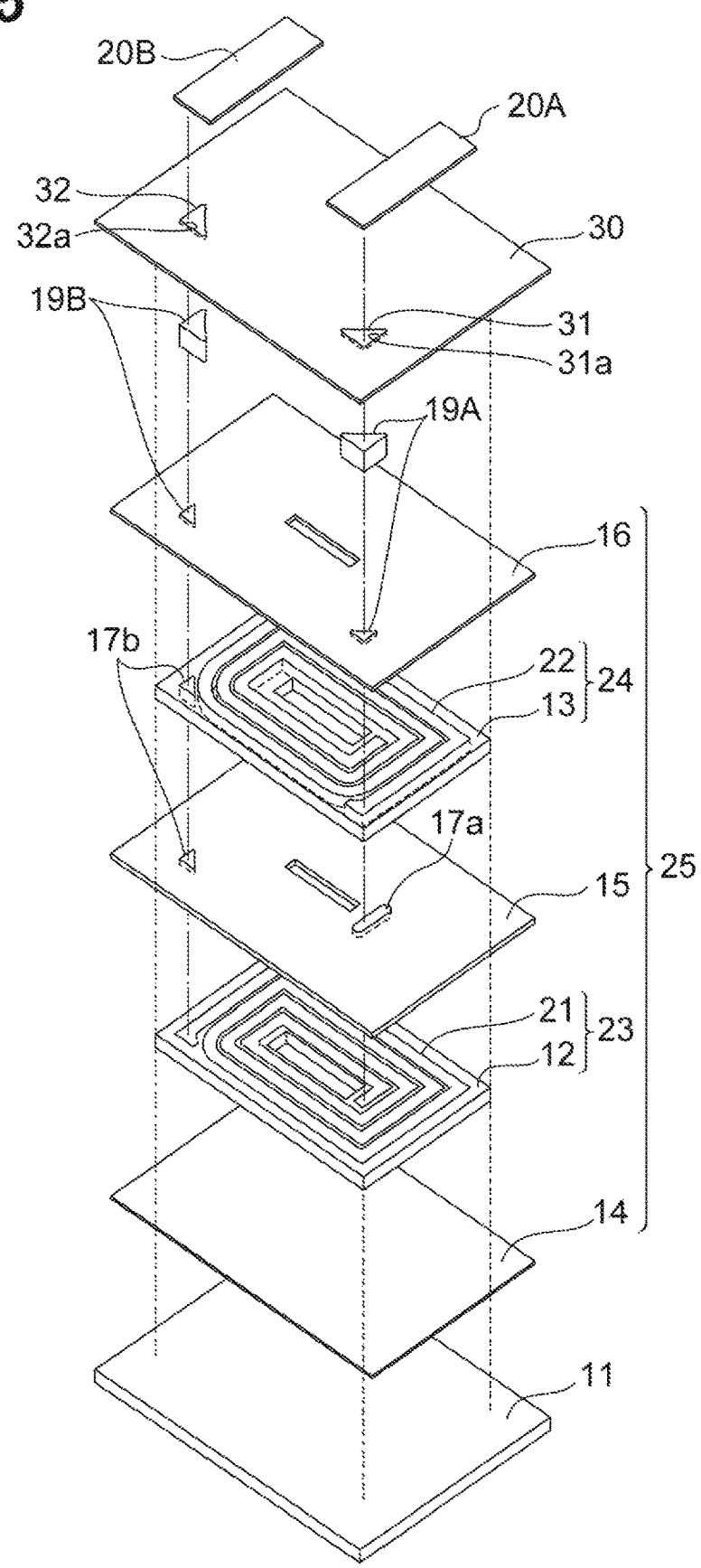
FIG. 5 is an exploded perspective view of the coil component in FIG. 3.

With reference to FIGS. 3 to 5, the configuration of the coil component 10 will be described. FIG. 3 is a perspective view of the coil component 10. FIG. 4 is a sectional view of the coil component 10 taken along line IV-IV. FIG. 5 is an exploded perspective view of the coil component 10. The exploded perspective view of FIG. 5 does not illustrate a magnetic resin layer 18 in FIG. 3.

As illustrated in FIG. 3, the coil component 10 includes a coil portion 25 (will be described later), a covering portion 7 covering the coil portion 25, and an insulative layer 30 provided on a main surface 7a of the covering portion 7. The covering portion 7 has a rectangular parallelepiped exterior. The main surface 7a of the covering portion 7 has a rectangular shape having long sides and short sides. As an example of the external dimensions of the covering portion 7, the length of the short side is approximately 2.0 mm, the length of the long side is approximately 3.0 mm, and the thickness is approximately 0.3 mm. Examples of the rectangular shape include a rectangular shape having rounded corners. Examples of the rectangular parallelepiped shape include a rectangular parallelepiped shape having chamfered corners and ridge portions, and a rectangular parallelepiped shape having rounded corners and ridge portions. For example, the covering portion 7 is configured to be formed of a magnetic material. Specifically, the covering portion 7 is configured to include a magnetic substrate 11 and the magnetic resin layer 18.

Terminal electrodes 20A and 20B are provided on the main surface 7a via the insulative layer 30. The terminal electrode 20A is disposed along one short side of the main surface 7a, and the terminal electrode 20B is disposed along the other short side of the main surface 7a. The terminal electrodes 20A and 20B are spaced away from each other in a direction along the long side of the main surface 7a.

For example, the magnetic substrate 11 is a substantially flat substrate configured to be formed of a magnetic material such as ferrite (refer to FIG. 5). The magnetic substrate 11 is positioned on a side of the covering portion 7 which is opposite to the main surface 7a. The magnetic resin layer 18 and the coil portion 25 (will be described later) are formed in the magnetic substrate 11.

The magnetic resin layer 18 is formed on the magnetic substrate 11. A surface 18a on a side opposite to a surface 18b on the magnetic substrate 11 side of the magnetic resin layer 18 configures the main surface 7a of the covering portion 7. The magnetic resin layer 18 is a mixture of magnetic powder and binder resin. For example, the configuration material of the magnetic powder is iron, carbonyl iron, silicon, chromium, nickel, or boron. For example, the configuration material of the binder resin is epoxy resin. The magnetic resin layer 18 may be configured to be formed of the magnetic powder 90% or more in its entirety.

Each of a pair of terminal electrodes 20A and 20B provided on the main surface 7a of the covering portion 7 has a shape of a film, and has a substantially rectangular shape in a top view. The terminal electrodes 20A and 20B have areas substantially the same as each other. For example, the terminal electrodes 20A and 20B are configured to be formed of conductive materials such as Cu. The terminal electrodes 20A and 20B are plating electrodes formed via plating. The terminal electrodes 20A and 20B may have single-layer structures or multi-layer structures.

The insulative layer 30 provided on the main surface 7a of the covering portion 7 is interposed between the pair of terminal electrodes 20A and 20B on the main surface 7a. In the present embodiment, the insulative layer 30 is provided in such a manner as to cover the entire region of the main surface 7a and includes a portion which extends in a direction intersecting the long-side direction (direction in which the pair of terminal electrodes 20A and 20B is adjacent to each other) and traverses the main surface 7a. The insulative layer 30 has through holes 31a and 32a (apertures) at positions corresponding to lead-out conductors 19A and 19B. Inside the through holes 31a and 32a, there are provided conductor portions 31 and 32 configured to be formed of conductive materials such as Cu. The insulative layer 30 is configured to be formed of an insulative material. For example, the insulative layer 30 is configured to be formed of insulative resin such as polyimide and epoxy.

As illustrated in FIGS. 4 and 5, the coil portion 25 and the lead-out conductors 19A and 19B are disposed within the magnetic resin layer 18.

The coil portion 25 has a plurality layers (in the present embodiment, two layers) of ring-shaped planar coil portions 23 and 24, a plurality layers (in the present embodiment, three layers) of insulative resin layers 14 to 16 overlapping the planar coil portions 23 and 24, and connection portions 17a and 17b.

The planar coil portion 23 and the planar coil portion 24 are arranged side by side in a direction orthogonal to the main surface 7a, and the planar coil portion 24 is positioned closer to the main surface 7a side than the planar coil portion 23. Each of the planar coil portions 23 and 24 is symmetrical in shape in a top view (specifically, a rectangular shape). In the present embodiment, the planar coil portion 23 and the planar coil portion 24 have dimensions substantially the same as each other. That is, the planar coil portion 23 and the planar coil portion 24 exhibit rectangular ring shapes having outer edge dimensions and inner edge dimensions equal to each other in a top view, and forming regions thereof completely coincide with each other.

The planar coil portion 23 has a coil-wound portion 21 and an insulative resin layer 12 which are positioned together in the same layer. The coil-wound portion 21 is rectangularly wound in a top view. For example, the coil-wound portion 21 is configured to be formed of a metal material such as Cu. The insulative resin layer 12 (intra insulative layer) covers the periphery of the coil-wound portion 21 within the same layer as the coil-wound portion 21. Specifically, the insulative resin layer 12 fills the periphery (inner peripheral side and outer peripheral side) of the coil-wound portion 21 within the same layer, and gaps between windings.

The planar coil portion 24 has a coil-wound portion 22 and an insulative resin layer 13 which are positioned together in the same layer. The coil-wound portion 22 is rectangularly wound in a top view. The winding direction of the coil-wound portion 22 is the same as the winding direction of the coil-wound portion 21. For example, the coil-wound portion 22 is configured to be formed of a metal material such as Cu. The insulative resin layer 13 (intra insulative layer) covers the periphery of the coil-wound portion 22 within the same layer as the coil-wound portion 22. Specifically, the insulative resin layer 13 fills the periphery (inner peripheral side and outer peripheral side) of the coil-wound portion 22 within the same layer, and gaps between windings.

The insulative resin layers 14 to 16 (extra insulative layers) are provided in order of the insulative resin layer 14, the insulative resin layer 15, and the insulative resin layer 16 from the magnetic substrate 11 side. Each of the planar coil portions 23 and 24 is interposed between insulative resin layers adjacent to each other in the stacking direction. That is, the planar coil portion 23 is interposed between the insulative resin layer 14 and the insulative resin layer 15, and the planar coil portion 24 is interposed between the insulative resin layer 15 and the insulative resin layer 16.

The insulative resin layer 14 is positioned below the planar coil portion 23 (magnetic substrate 11 side). The insulative resin layer 14 faces the planar coil portion 23 from the magnetic substrate 11 side and overlaps the planar coil portion 23. The insulative resin layer 15 is positioned between the planar coil portion 23 and the planar coil portion 24. The insulative resin layer 15 faces the planar coil portion 24 from the magnetic substrate 11 side and overlaps the planar coil portion 24. The insulative resin layer 15 faces the planar coil portion 23 from the main surface 7a side and overlaps the planar coil portion 23. The insulative resin layer 16 is positioned above the planar coil portion 24 (main surface 7a side). The insulative resin layer 16 faces the planar coil portion 24 from the main surface 7a side and overlaps the planar coil portion 24.

Each of the above-described insulative resin layers 12 to 16 is insulative and is configured to be formed of insulative resin. Examples of the insulative resin include polyimide, acryl, and epoxy. The insulative resin layers 12 to 16 are bound together in the stacking direction and are integrated to the extent that the boundaries among the insulative resin layers 12 to 16 cannot visually recognized in practice. The insulative resin layers 12 to 16 cover the upper surface (surface on the main surface 7a side), the lower surface (surface on the magnetic substrate 11 side), and the side surface (surface parallel to the stacking direction) of each of the coil-wound portions 21 and 22.

The connection portion 17a is positioned in the same layer as the insulative resin layer 15 and penetrates the insulative resin layer 15. The connection portion 17a is interposed between the coil-wound portion 21 and the coil-wound portion 22, thereby connecting winding of the coil-wound portion 21 on the innermost side and winding of the coil-wound portion 22 on the innermost side together. The connection portion 17b penetrates the insulative resin layers 13 and 15 from the winding of the coil-wound portion 21 on the outermost side and extends to the main surface 7a side, thereby connecting the coil-wound portion 21 and the lead-out conductor 19B together. For example, the connection portions 17a and 17b are configured to be formed of metal materials such as Cu.

For example, the lead-out conductors 19A and 19B are configured to be formed of metal materials such as Cu. The lead-out conductor 19A is connected to the winding of the coil-wound portion 22 on the outermost side. The lead-out conductor 19A extends from the winding of the coil-wound portion 22 on the outermost side to the main surface 7a of the covering portion 7 in such a manner as to penetrate the insulative resin layer 16 and the magnetic resin layer 18, thereby being exposed through the main surface 7a. The terminal electrode 20A is provided on the main surface 7a at a position corresponding to the exposed portion of the lead-out conductor 19A. The lead-out conductor 19A is connected to the terminal electrode 20A through the conductor portion 31 inside the through hole 31a of the insulative layer 30. Accordingly, the winding of the coil-wound portion 22 on the outermost side and the terminal electrode 20A are electrically connected to each other via the lead-out conductor 19A and the conductor portion 31.

The lead-out conductor 19B is connected to the winding of the coil-wound portion 21 on the outermost side. The lead-out conductor 19B extends from the connection portion 17b to the main surface 7a of the covering portion 7 in such a manner as to penetrate the insulative resin layer 16 and the magnetic resin layer 18, thereby being exposed through the main surface 7a. The terminal electrode 20B is provided on the main surface 7a at a position corresponding to the exposed portion of the lead-out conductor 19B. The lead-out conductor 19B is connected to the terminal electrode 20B through the conductor portion 32 inside the through hole 32a of the insulative layer 30. Accordingly, the winding of the coil-wound portion 21 on the outermost side and the terminal electrode 20B are electrically connected to each other via the connection portion 17b, the lead-out conductor 19B, and the conductor portion 32.

Figure 6:
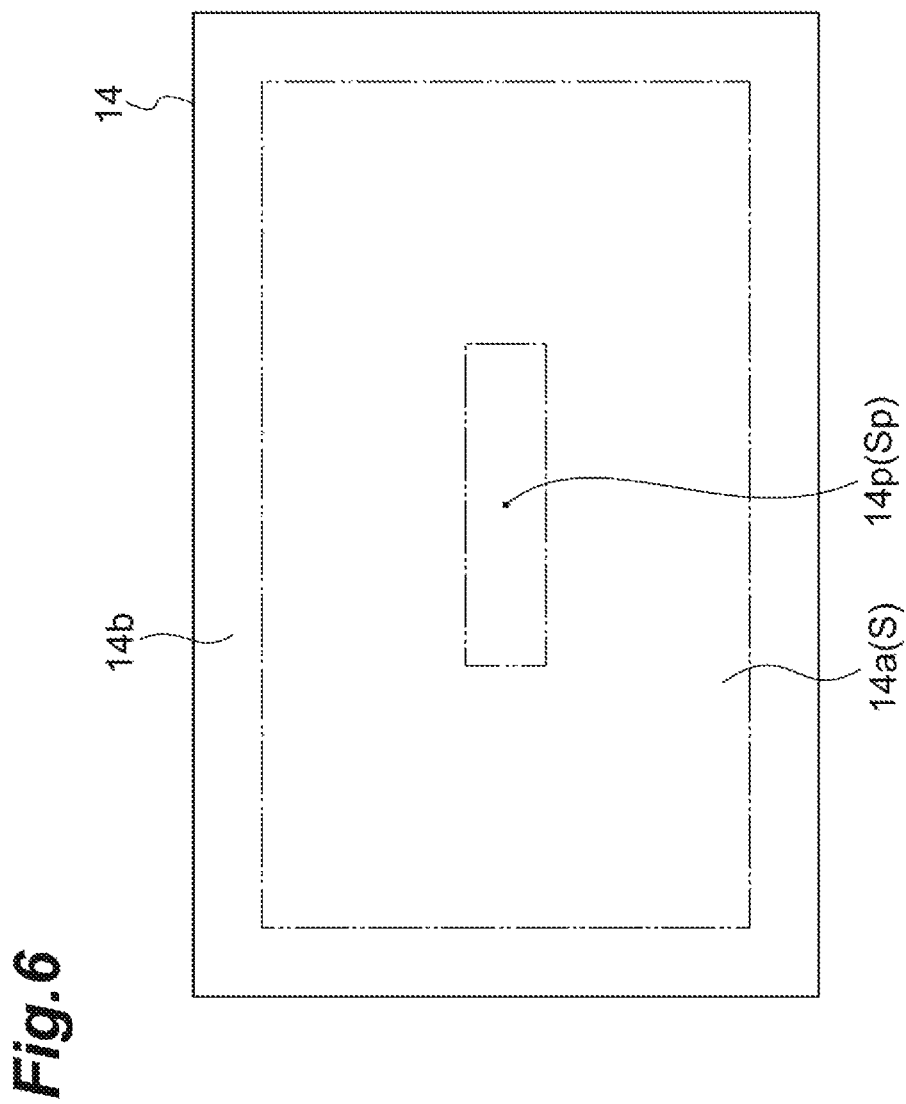
FIG. 6 is a top view illustrating a superimposing region and a protrusion region of an insulative resin layer illustrated in FIG. 3.
Figure 7:
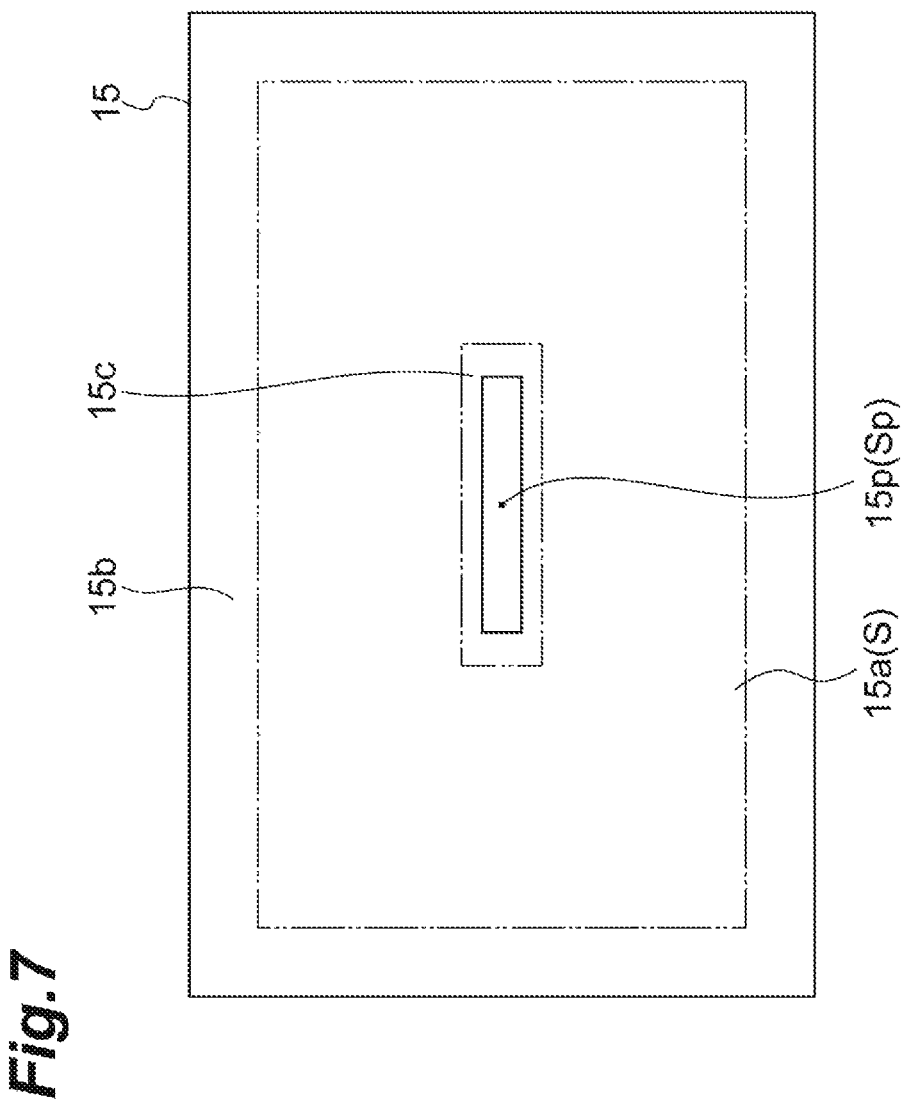
FIG. 7 is a top view illustrating a superimposing region and a protrusion region of another insulative resin layer illustrated in FIG. 3.

Next, with reference to FIGS. 6 to 8, an overlapping state of the insulative resin layers 14 to 16 with respect to forming regions of planar coil portions 23 and 24 will be described in detail. FIGS. 6 to 8 are top views illustrating superimposing regions 14a, 15a, and 16a and protrusion regions 14b, 15b, 16b, 15c, and 16c of the insulative resin layers 14 to 16. In FIGS. 6 to 8, each of the edges on the inner peripheral side and the outer peripheral side defining the forming regions S of the planar coil portions 23 and 24 is indicated by the two-dot chain line. Hereinafter, the edge on the inner peripheral side defining the forming region S will also be referred to as "inner peripheral edge", and the edge on the outer peripheral side defining the forming region S will also be referred to as "outer peripheral edge".

As illustrated in FIG. 6, when viewed in a direction of overlapping the planar coil portion 23, the insulative resin layer 14 has the superimposing region 14a overlapping the forming region S of the planar coil portion 23, and the protrusion region 14b protruding from the outer peripheral edge of the superimposing region 14a.

The superimposing region 14a is a region surrounded by the inner peripheral edge and the outer peripheral edge of the forming region S of the planar coil portion 23. When viewed in the direction of overlapping the planar coil portion 23, the superimposing region 14a completely coincides with the forming region S of the planar coil portion 23.

When viewed in the direction of overlapping the planar coil portion 23, the protrusion region 14b protrudes outward from the outer peripheral edge of the superimposing region 14a (that is, the forming region S of the planar coil portion 23). When viewed in the direction of overlapping the planar coil portion 23, the protrusion region 14b protrudes from the outer peripheral edge of the superimposing region 14a in its entirety and extends in such a manner as to enter the covering portion 7. More specifically, in the protrusion region 14b, as illustrated in FIG. 4, a side end surface 14d parallel to the stacking direction is in contact with the covering portion 7. In addition, an upper end surface 14e and a lower end surface 14f parallel to the main surface 7a are also in contact with the covering portion 7. As a result, the contact area of the insulative resin layer 14 with respect to the covering portion 7 is widened as much as the protrusion region 14b. Specifically, in a case where the protrusion region 14b is provided, the contact area is further widened as much as the upper end surface 14e and the lower end surface 14f of the protrusion region 14b compared to a case where the protrusion region 14b is not provided.

In addition, as illustrated in FIG. 4, a portion of the protrusion region 14b of the insulative resin layer 14 protrudes in a direction parallel to the main surface 7a beyond the planar coil portion 23 adjacent in the stacking direction and enters the covering portion 7. The protrusion region 14b is enclosed by the covering portion 7 on three surfaces of the side end surface 14d, the upper end surface 14e, and the lower end surface 14f. Accordingly, the protrusion region 14b is in a state of intruding into the covering portion 7.

Moreover, when viewed in the direction of overlapping the planar coil portion 23, the exterior of the insulative resin layer 14, that is, the shape of the outer peripheral edge of the insulative resin layer 14 exhibits a rectangular shape having a relationship analogous with the shape of the outer peripheral edge of the forming region S of the planar coil portion 23. A center 14p thereof coincides with a center Sp of the forming region S of the planar coil portion 23. The center 14p is a point where the bisector of the long sides and the bisector of the short sides intersect each other in the rectangular shape of the outer peripheral edge of the insulative resin layer 14. The center Sp is a point where the bisector of the long sides and the bisector of the short sides intersect each other in the rectangular shape of the outer peripheral edge of the forming region S. Accordingly, when viewed in the direction of overlapping the planar coil portion 23, the protrusion region 14b of the insulative resin layer 14 is symmetrical in shape in regard to the center Sp of the forming region S of the planar coil portion 23 (specifically, line-symmetrical in shape in regard to the axis of symmetry passing through the center Sp, or point-symmetrical in shape in regard to the center of symmetry passing through the center Sp).

As illustrated in FIG. 7, when viewed in the direction of overlapping the planar coil portions 23 and 24, the insulative resin layer 15 has the superimposing region 15a overlapping the forming regions S of the planar coil portions 23 and 24, the protrusion region 15b protruding from the outer peripheral edge of the superimposing region 15a, and the protrusion region 15c protruding from the inner peripheral edge of the superimposing region 15a.

The superimposing region 15a is a region surrounded by the inner peripheral edges and the outer peripheral edges of the forming regions S of the planar coil portions 23 and 24. When viewed in the direction of overlapping the planar coil portions 23 and 24, the superimposing region 15a completely coincides with the forming regions S of the planar coil portions 23 and 24.

When viewed in the direction of overlapping the planar coil portions 23 and 24, the protrusion region 15b protrudes outward from the outer peripheral edge of the superimposing region 15a (that is, the forming regions S of the planar coil portions 23 and 24). When viewed in the direction of overlapping the planar coil portions 23 and 24, the protrusion region 15b protrudes from the outer peripheral edge of the superimposing region 15a in its entirety and extends in such a manner as to enter the covering portion 7.

When viewed in the direction of overlapping the planar coil portions 23 and 24, the protrusion region 15c protrudes inward from the inner peripheral edge of the superimposing region 15a (that is, the forming regions S of the planar coil portions 23 and 24). When viewed in the direction of overlapping the planar coil portions 23 and 24, the protrusion region 15c protrudes from the inner peripheral edge of the superimposing region 15a in its entirety and extends in such a manner as to enter the covering portion 7.

More specifically, in the protrusion regions 15b and 15c, a side end surface 15d is in contact with the covering portion 7. In addition, an upper end surface 15e and a lower end surface 15f parallel to the main surface 7a are also in contact with the covering portion 7. As a result, the contact area of the insulative resin layer 15 with respect to the covering portion 7 is widened as much as the protrusion regions 15b and 15c. Specifically, in a case where the protrusion regions 15b and 15c are provided, the contact area is further widened as much as the upper end surface 15e and the lower end surface 15f of the protrusion regions 15b and 15c compared to a case where the protrusion regions 15b and 15c are not provided.

In addition, as illustrated in FIG. 4, portions of the protrusion regions 15b and 15c of the insulative resin layer 15 protrude in the direction parallel to the main surface 7a beyond the planar coil portions 23 and 24 adjacent in the stacking direction and enter the covering portion 7. The protrusion regions 15b and 15c are enclosed by the covering portion 7 on three surfaces of the side end surface 15d, the upper end surface 15e, and the lower end surface 15f. Accordingly, the protrusion region 15b is in a state of intruding into the covering portion 7.

Moreover, when viewed in the direction of overlapping the planar coil portions 23 and 24, the exterior of the insulative resin layer 15 has a relationship analogous with the exteriors of the forming regions S of the planar coil portions 23 and 24. That is, the shape of the outer peripheral edge of the insulative resin layer 15 has a relationship analogous with the shapes of the outer peripheral edges of the forming regions S of the planar coil portions 23 and 24, and the shape of the inner peripheral edge of the insulative resin layer 15 exhibits a rectangular ring shape having a relationship analogous with the shapes of the inner peripheral edges of the forming regions S of the planar coil portions 23 and 24. A center 15p of the insulative resin layer 15 coincides with the centers Sp of the forming regions S of the planar coil portions 23 and 24. The center 15p is a point where the bisector of the long sides and the bisector of the short sides intersect each other in the rectangular shape of the outer peripheral edge of the insulative resin layer 15. Accordingly, when viewed in the direction of overlapping the planar coil portions 23 and 24, the protrusion regions 15b and 15c of the insulative resin layer 15 are symmetrical in shape in regard to the centers Sp of the forming regions S of the planar coil portions 23 and 24 (specifically, line-symmetrical in shape in regard to the axis of symmetry passing through the center Sp, or point-symmetrical in shape in regard to the center of symmetry passing through the center Sp).

As illustrated in FIG. 8, when viewed in the direction of overlapping the planar coil portion 24, the insulative resin layer 16 has the superimposing region 16a overlapping the forming region S of the planar coil portion 24, the protrusion region 16b protruding from the outer peripheral edge of the superimposing region 16a, and the protrusion region 16c protruding from the inner peripheral edge of the superimposing region 16a.

The superimposing region 16a is a region surrounded by the inner peripheral edge and the outer peripheral edge of the forming region S of the planar coil portion 24. When viewed in the direction of overlapping the planar coil portion 24, the superimposing region 16a completely coincides with the forming region S of the planar coil portion 24.

When viewed in the direction of overlapping the planar coil portion 24, the protrusion region 16b protrudes outward from the outer peripheral edge of the superimposing region 16a (that is, the forming region S of the planar coil portion 24). When viewed in the direction of overlapping the planar coil portion 24, the protrusion region 16b protrudes from the outer peripheral edge of the superimposing region 16a in its entirety and extends in such a manner as to enter the covering portion 7.

When viewed in the direction of overlapping the planar coil portion 24, the protrusion region 16c protrudes inward from the inner peripheral edge of the superimposing region 16a (that is, the forming region S of the planar coil portion 24). When viewed in the direction of overlapping the planar coil portion 24, the protrusion region 16c protrudes from the inner peripheral edge of the superimposing region 16a in its entirety and extends in such a manner as to enter the covering portion 7.

More specifically, in the protrusion regions 16b and 16c, a side end surface 16d is in contact with the covering portion 7. In addition, an upper end surface 16e and a lower end surface 16f parallel to the main surface 7a are also in contact with the covering portion 7. As a result, the contact area of the insulative resin layer 16 with respect to the covering portion 7 is widened as much as the protrusion regions 16b and 16c. Specifically, in a case where the protrusion regions 16b and 16c are provided, the contact area is further widened as much as the upper end surface 16e and the lower end surface 16f of the protrusion regions 16b and 16c compared to a case where the protrusion regions 16b and 16c are not provided.

In addition, as illustrated in FIG. 4, portions of the protrusion regions 16b and 16c of the insulative resin layer 16 protrude in the direction parallel to the main surface 7a beyond the planar coil portion 24 adjacent in the stacking direction and enter the covering portion 7. The protrusion regions 16b and 16c are enclosed by the covering portion 7 on three surfaces of the side end surface 16d, the upper end surface 16e, and the lower end surface 16f. Accordingly, the protrusion region 16b is in a state of intruding into the covering portion 7.

Moreover, when viewed in the direction of overlapping the planar coil portion 24, the exterior of the insulative resin layer 16 has a relationship analogous with the exterior of the forming region S of the planar coil portion 24. That is, the shape of the outer peripheral edge of the insulative resin layer 16 has a relationship analogous with the shape of the outer peripheral edge of the forming region S of the planar coil portion 24, and the shape of the inner peripheral edge of the insulative resin layer 16 exhibits a rectangular ring shape having a relationship analogous with the shape of the inner peripheral edge of the forming region S of the planar coil portion 24. A center 16p of the insulative resin layer 16 coincides with the center Sp of the forming region S of the planar coil portion 24. The center 16p is a point where the bisector of the long sides and the bisector of the short sides intersect each other in the rectangular shape of the outer peripheral edge of the insulative resin layer 16. Accordingly, when viewed in the direction of overlapping the planar coil portion 24, the protrusion regions 16b and 16c of the insulative resin layer 16 are symmetrical in shape in regard to the center Sp of the forming region S of the planar coil portion 24 (specifically, line-symmetrical in shape in regard to the axis of symmetry passing through the center Sp, or point-symmetrical in shape in regard to the center of symmetry passing through the center Sp).

Next, with reference to FIGS. 9A to 11D, a method of making a coil component 10 will be described. FIGS. 9A to 11D are views describing a step of making a coil component 10.

Figure 9A:
FIGS. 9A to 9D are views describing a step of making the coil component in FIG. 3.
Figure 9B:
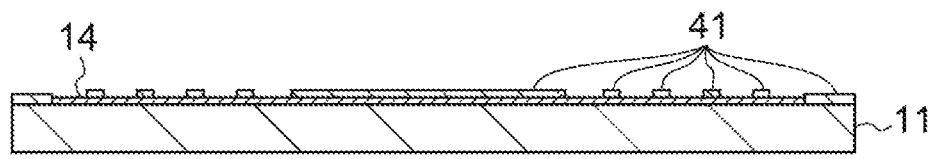
Figure 9C:
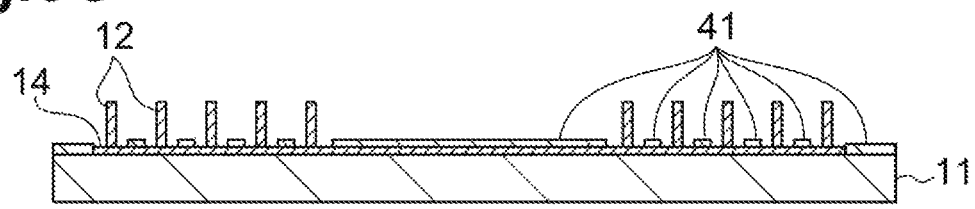
Figure 9D:
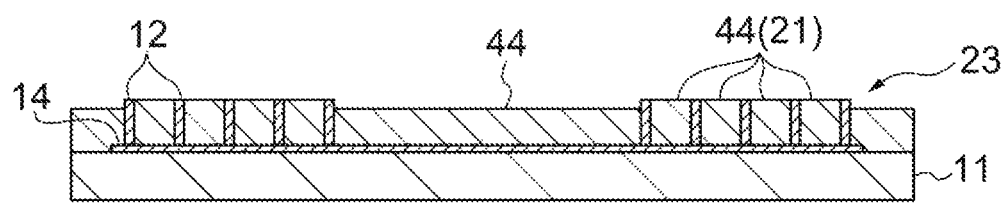

First, as illustrated in FIG. 9A, after the magnetic substrate 11 is coated with insulative resin, patterning is performed through a technique such as photolithography, thereby forming the insulative resin layer 14. Subsequently, as illustrated in FIG. 9B, seed portions 41 for forming the coil-wound portion 21 via plating are formed on the insulative resin layer 14. The seed portions 41 can be formed through plating, sputtering, or the like by using a predetermined mask. Subsequently, as illustrated in FIG. 9C, the insulative resin layer 12 is formed. After the entire surface of the magnetic substrate 11 is coated with the insulative resin, the insulative resin layer 12 can be obtained by removing the insulative resin corresponding to the portions of the seed portions 41 through patterning performed by using the technique such as photolithography. That is, the insulative resin layer 12 has a function of exposing the seed portions 41. The insulative resin layer 12 is a wall-like portion standing on the magnetic substrate 11 and divides the regions where the coil-wound portion 21 is formed. Subsequently, as illustrated in FIG. 9D, a plating layer 44 is formed in gaps among the insulative resin layers 12 by using the seed portions 41. In this case, the plating developed in such a manner as to fill the divided regions among the insulative resin layers 12 becomes the coil-wound portion 21. As a result, the winding of the coil-wound portion 21 is positioned between the insulative resin layers 12 adjacent to each other, thereby forming the planar coil portion 23 having the coil-wound portion 21 and the insulative resin layer 12.

Figure 10A:
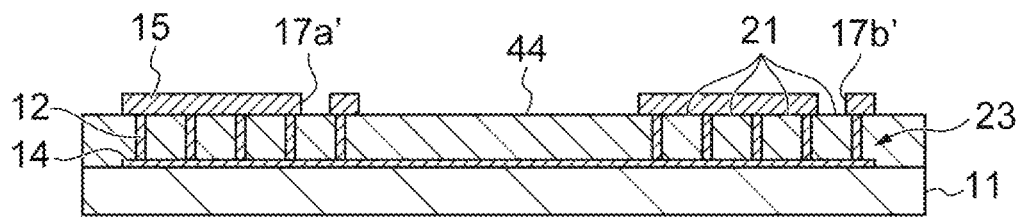
FIGS. 10A to 10D are views describing the step of making the coil component in FIG. 3.
Figure 10B:
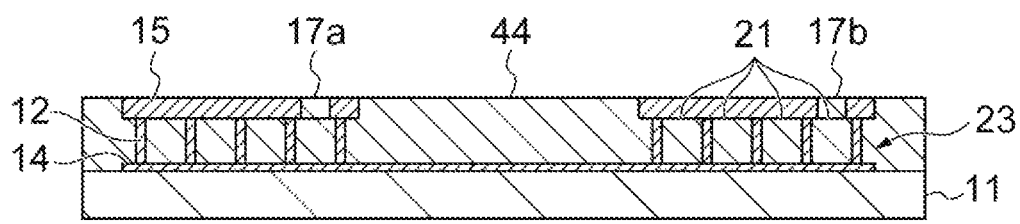

Subsequently, as illustrated in FIG. 10A, after the coil-wound portion 21 is coated with insulative resin, patterning is performed through a technique such as photolithography, thereby forming the insulative resin layer 15. In this case, opening portions 17a' and 17b' for forming the connection portions 17a and 17b are formed in the insulative resin layer 15. Subsequently, as illustrated in FIG. 10B, the connection portions 17a and 17b are respectively formed in the opening portions 17a' and 17b' of the insulative resin layer 15 via plating.

Figure 10C:
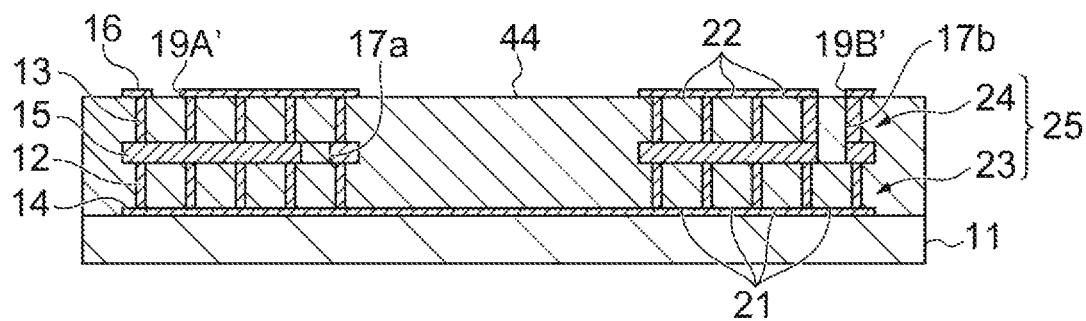

Subsequently, as illustrated in FIG. 10C, similar to the step described above, the coil-wound portion 22 and the insulative resin layers 13 and 16 are formed on the insulative resin layer 15. Specifically, similar to the procedures illustrated in FIGS. 9B to 9D, seed portions for forming the coil-wound portion 22 via plating are formed and the insulative resin layer 13 which divides the regions for forming the coil-wound portion 22 is formed, thereby forming the coil-wound portion 22 among the insulative resin layers 13 via plating. As a result, the winding of the coil-wound portion 22 is positioned between the insulative resin layers 13 adjacent to each other, thereby forming the planar coil portion 24 having the coil-wound portion 22 and the insulative resin layer 13. As described above, the coil portion 25 having the planar coil portions 23 and 24, the insulative resin layers 14 to 16 respectively overlapping the planar coil portions 23 and 24, and the connection portions 17a and 17b is formed.

After the coil-wound portion 22 is coated with insulative resin, patterning is performed through a technique such as photolithography, thereby forming the insulative resin layer 16. In this case, opening portions 19A' and 19B' for forming the lead-out conductors 19A and 19B are formed in the insulative resin layer 16.

Figure 10D:
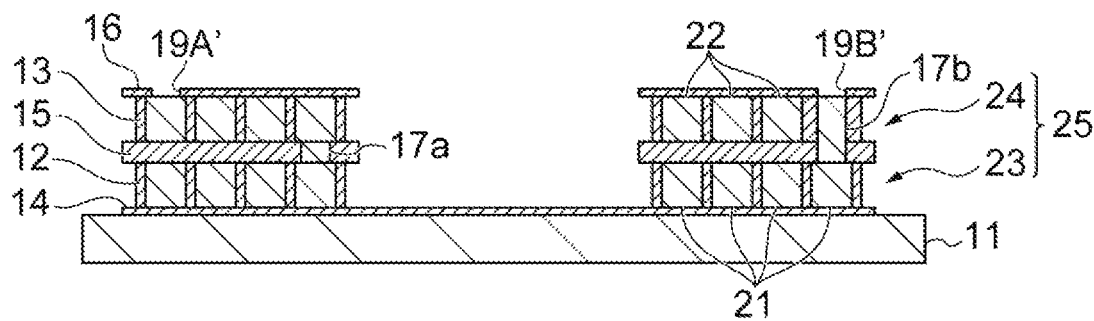
Figure 11A:
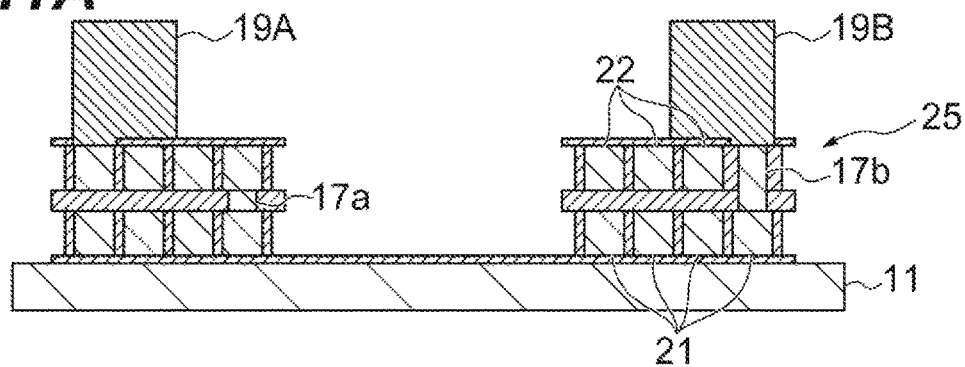
FIGS. 11A to 11D are views describing the step of making the coil component in FIG. 3.

Subsequently, as illustrated in FIG. 10D, in the plating layer 44, portions not configuring the coil-wound portions 21 and 22 (portions corresponding to the inner peripheral portions and the outer peripheral portions of the coil-wound portions 21 and 22) are removed through etching. In other words, the plating layer 44 which is not covered with the insulative resin layers 12 to 16 in FIG. 10C is removed. Subsequently, as illustrated in FIG. 11A, the lead-out conductor 19A is formed at a position corresponding to the opening portion 19A' of the insulative resin layer 16, and the lead-out conductor 19B is formed at a position corresponding to the opening portion 19B'. Specifically, seed portions for the lead-out conductors 19A and 19B are respectively formed on the opening portions 19A' and 19B' through plating, sputtering, or the like by using a predetermined mask, thereby forming the lead-out conductors 19A and 19B via plating by using the seed portions.

Figure 11B:
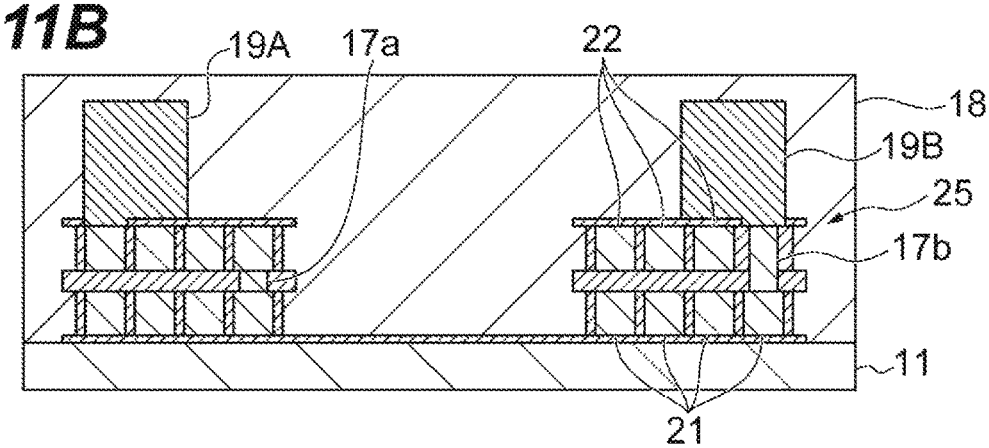
Figure 11C:
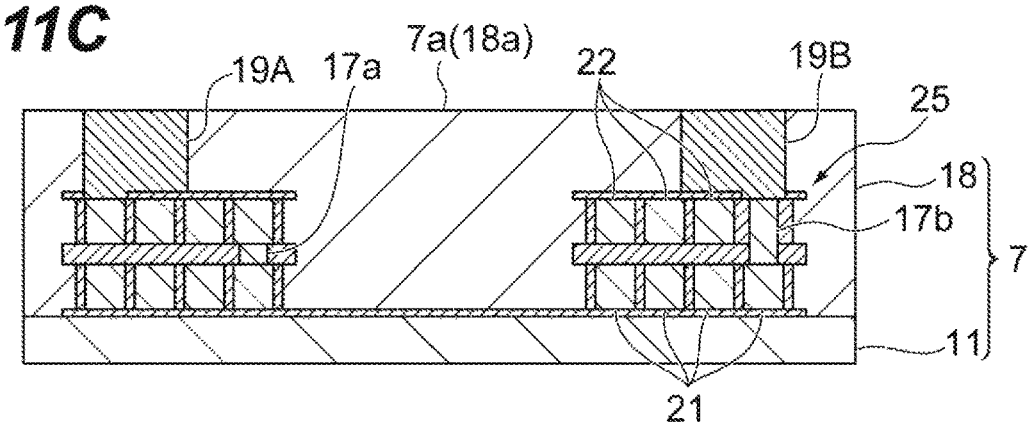

Subsequently, as illustrated in FIG. 11B, the entire surface of the magnetic substrate 11 is coated with magnetic resin and predetermined hardening is performed, thereby forming the magnetic resin layer 18. Accordingly, the peripheries of the coil portion 25 and the lead-out conductors 19A and 19B are covered with the magnetic resin layer 18. In this case, the inner diameter portion of the coil portion 25 is filled with the magnetic resin layer 18. Subsequently, as illustrated in FIG. 11C, grinding is performed such that the lead-out conductors 19A and 19B are exposed from the magnetic resin layer 18.

According to the step described above, it is possible to obtain the covering portion 7 in which the lead-out conductors 19A and 19B are exposed through the main surface 7a of the covering portion 7, thereby ending the step of preparing the covering portion 7.

Figure 11D:
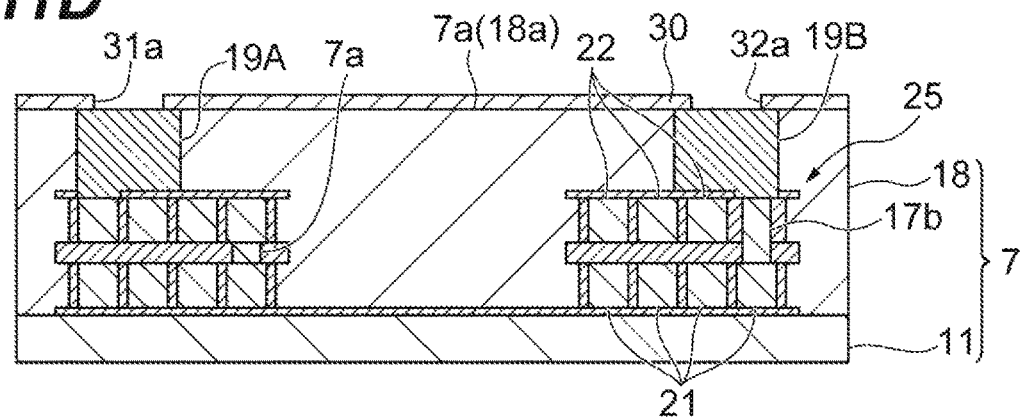

Subsequently, as illustrated in FIG. 11D, before the terminal electrodes 20A and 20B are formed via plating, the main surface 7a is coated with insulative resin. Thereafter, patterning is performed through a technique such as photolithography, thereby forming the insulative layer 30. When the insulative layer 30 is formed, the main surface 7a in its entirety is covered, the through holes 31a and 32a are formed at positions corresponding to the pair of lead-out conductors 19A and 19B, and the pair of lead-out conductors 19A and 19B are exposed through the insulative layer 30. Specifically, the entire region of the main surface 7a is temporarily coated with the insulative material. Thereafter, the insulative layer 30 at spots corresponding to the lead-out conductors 19A and 19B is removed.

On the insulative layer 30, seed portions (not illustrated) are formed in the regions corresponding to the terminal electrodes 20A and 20B through plating, sputtering, or the like by using a predetermined mask. The seed portions are also formed on the lead-out conductors 19A and 19B exposed through the through holes 31a and 32a of the insulative layer 30. Subsequently, the terminal electrodes 20A and 20B are formed through electroless plating by using the seed portions. In this case, the plating are developed in such a manner as to fill the through holes 31a and 32a of the insulative layer 30, thereby forming the conductor portions 31 and 32 and forming the terminal electrodes 20A and 20B on the insulative layer 30. In this manner, the coil component 10 is formed.

Hereinbefore, according to the coil component 10 of the present embodiment, in addition to superimposing regions 14a to 16a respectively overlapping the forming regions S of the planar coil portions 23 and 24, the insulative resin layers 14 to 16 of the coil portion 25 respectively have protrusion regions 14b to 16b protruding from the outer peripheral edges of the superimposing regions 14a to 16a. In addition to the superimposing regions 15a and 16a, the insulative resin layers 15 and 16 in the coil portion 25 have the protrusion regions 15c and 16c protruding from the inner peripheral edges of the superimposing regions 15a and 16a. Therefore, the contact areas of the insulative resin layers 14 to 16 with respect to the covering portion 7 covering the coil portion 25 are widened as much as the protrusion regions 14b to 16b, 15c, and 16c. Besides, in the insulative resin layers 14 to 16, portions of the protrusion regions 14b to 16b, 15c, and 16c extend in such a manner as to enter the covering portion 7, thereby intruding into the covering portion 7. Accordingly, adhesion of the insulative resin layers 14 to 16 with respect to the covering portion 7 is improved. Therefore, positional stability of the coil portion 25 within the covering portion 7 is improved. Thus, positional deviation of the coil portion 25 caused within the covering portion 7 due to thermal history, vibration, or the like can be prevented. As a result, a change in inductance can be prevented.

According to the coil component 10 of the present embodiment, the protrusion regions 14b to 16b, 15c, and 16c are symmetrically formed based on the centers Sp of the symmetrically-shaped forming regions S of the planar coil portions 23 and 24. Therefore, bias of stress caused within the covering portion 7 due to thermal history, vibration, or the like is equalized. Accordingly, positional stability of the coil portion 25 within the covering portion 7 is further improved.

According to the coil component 10 of the present embodiment, compared to a case where the protrusion regions 15c and 16c partially protrude from the inner peripheral edges of the superimposing regions 15a and 16a, the contact areas of the insulative resin layers 15 and 16 with respect to the covering portion 7 are further widened. Accordingly, adhesion of the insulative resin layers 15 and 16 with respect to the covering portion 7 is further improved. Thus, positional stability of the coil portion 25 within the covering portion 7 is further improved.

According to the coil component 10 of the present embodiment, compared to a case where the protrusion regions 14b to 16b partially protrude from the outer peripheral edges of the superimposing regions 14a to 16a, the contact areas of the insulative resin layers 14 to 16 with respect to the covering portion 7 are further widened. Accordingly, adhesion of the insulative resin layers 14 to 16 with respect to the covering portion 7 is additionally improved. Thus, positional stability of the coil portion 25 within the covering portion 7 is additionally improved.

Moreover, according to the coil component 10 of the present embodiment, in all of the plurality layers of insulative resin layers 14 to 16, adhesion with respect to the covering portion 7 is improved. Therefore, positional stability of the coil portion 25 within the covering portion 7 is further improved. In addition, since the coil portion 25 has the plurality layers of the planar coil portions 23 and 24, the number of times of winding in the coil portion 25 increases, and it is possible to obtain a coil component 10 having high inductance.

In addition, according to the power supply circuit unit 1 of the present embodiment including the coil component 10, a change in inductance caused due to thermal history, vibration, or the like can be prevented.

Figure 12:
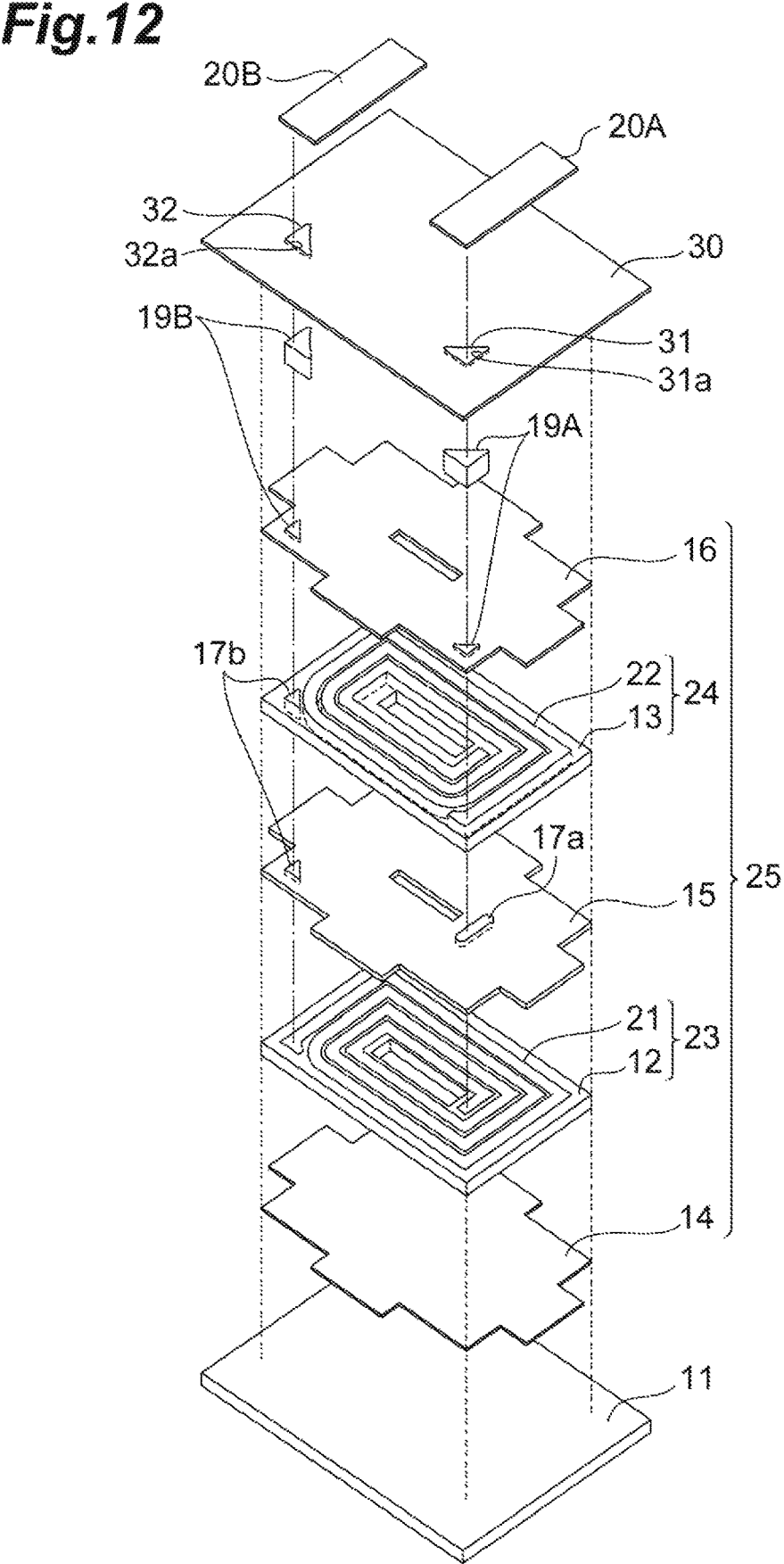
FIG. 12 is an exploded perspective view of a coil component according to another aspect.
Figure 13:
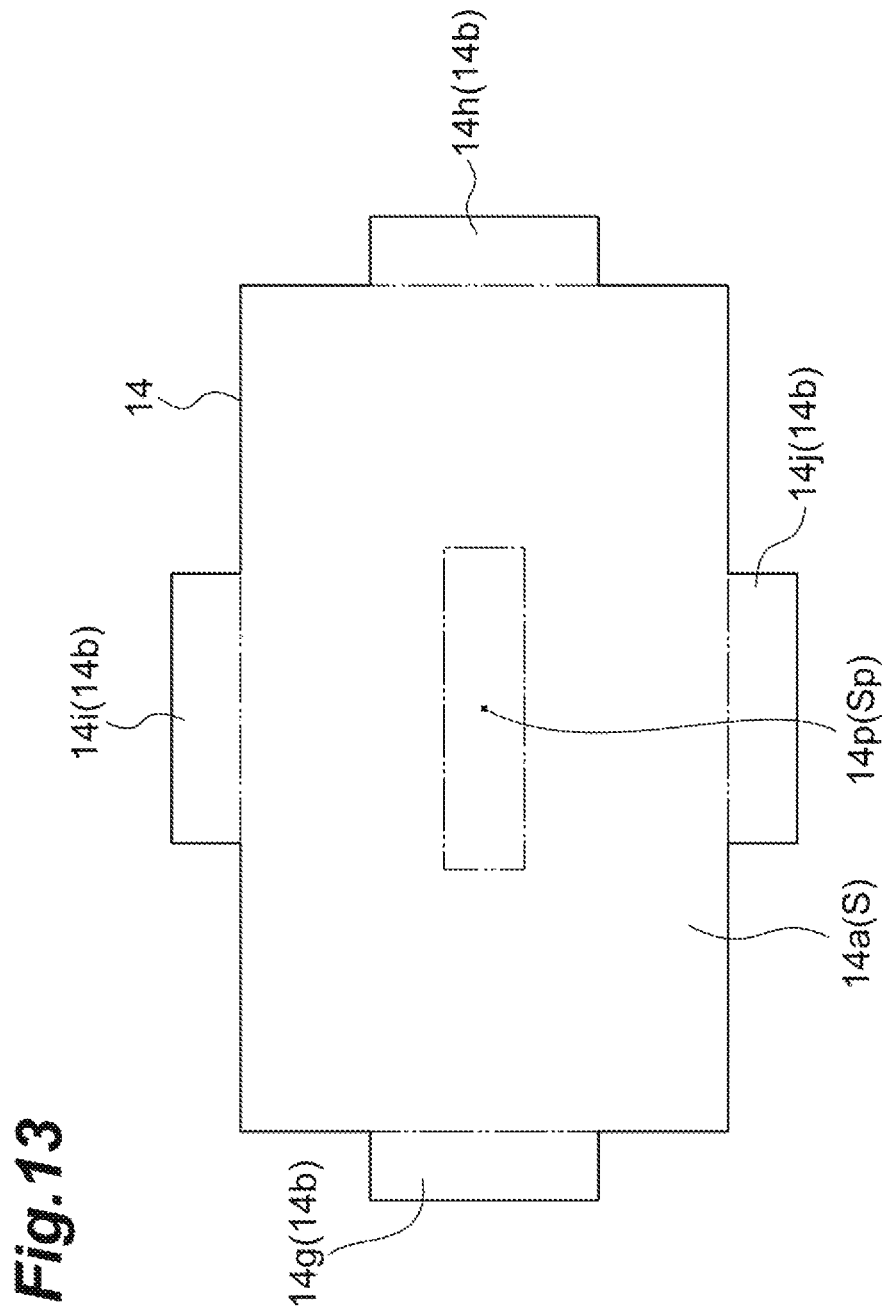
FIG. 13 is a top view illustrating a superimposing region and a protrusion region of an insulative resin layer illustrated in FIG. 12.
Figure 14:
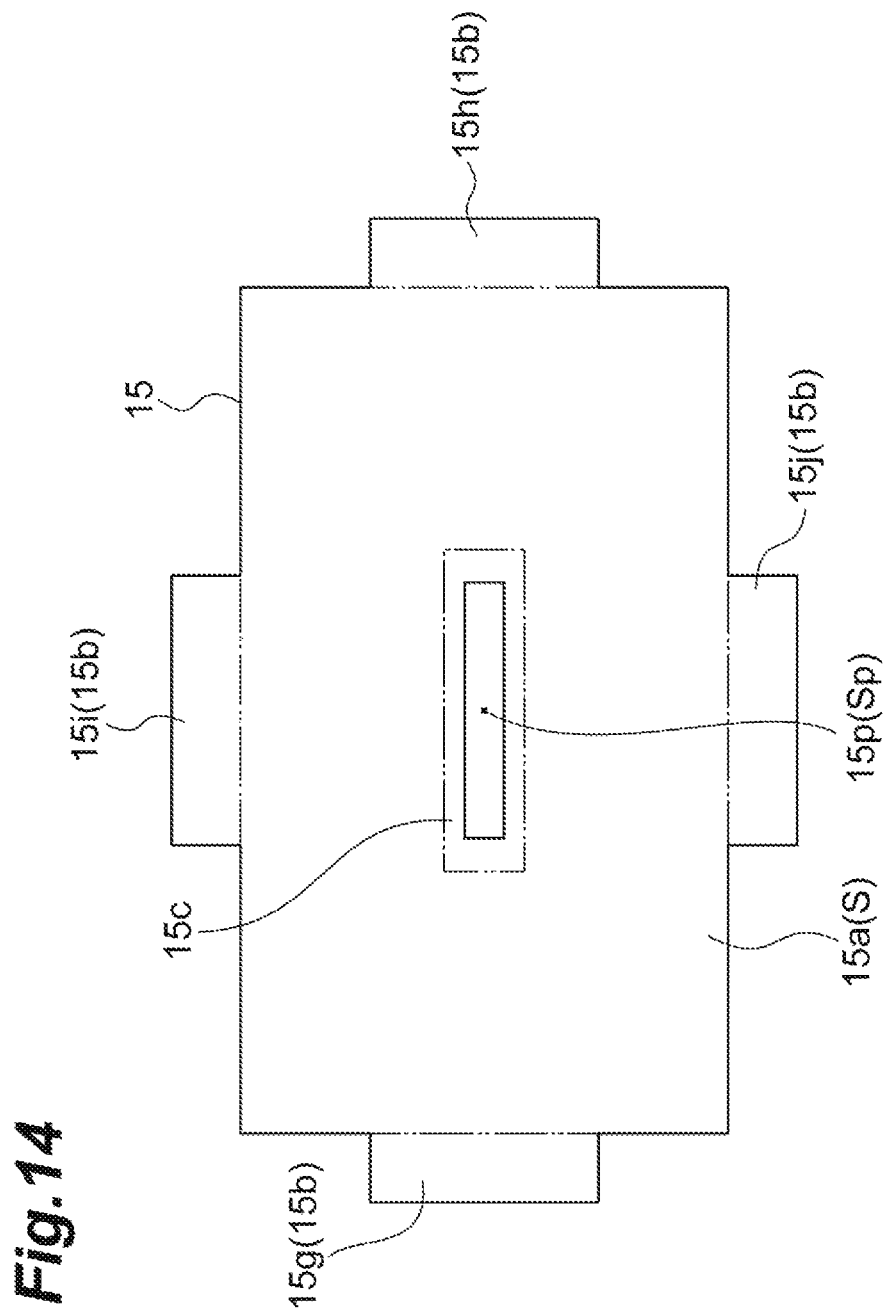
FIG. 14 is a top view illustrating a superimposing region and a protrusion region of another insulative resin layer illustrated in FIG. 12.

Next, with reference to FIGS. 12 to 15, a coil component according to another aspect different from the coil component 10 described above will be described. FIG. 12 is an exploded perspective view corresponding to FIG. 5 of the coil component 10 described above. FIGS. 13 to 15 are top views corresponding to FIGS. 6 to 8 of the coil component 10 described above. In FIGS. 13 to 15 as well, each of the edges on the inner peripheral side and the outer peripheral side defining the forming regions S of the planar coil portions 23 and 24 is indicated by the two-dot chain line.

In the coil component according to the aspect illustrated in FIGS. 12 to 15, the shapes of the insulative resin layers 14 to 16 are different from those of the embodiment described above. Specifically, the protrusion regions 14b to 16b of the insulative resin layers 14 to 16 on the outer peripheral side partially protrude from the outer peripheral edges of the superimposing regions 14a to 16a, not from the outer peripheral edges of the superimposing regions 14a to 16a in its entirety. The protrusion regions 15c and 16c of the insulative resin layers 15 and 16 on the inner peripheral side are similar to those of the coil component 10 described above.

As illustrated in FIG. 13, the protrusion region 14b in the insulative resin layer 14 on the outer peripheral side includes protrusion regions 14g, 14h, 14i, and 14j positioned in such a manner as to respectively correspond to the long sides and the short sides in the outer peripheral edge of the forming region S of the planar coil portion 23. For example, the widths of the protrusion regions 14g to 14j (lengths along the long sides and the short sides in the outer peripheral edge of the forming region S) are approximately ⅓ times each of the long sides and each of the short sides in the outer peripheral edge of the forming region S of the planar coil portion 23.

The protrusion region 14g and the protrusion region 14h are positioned in such a manner as to respectively correspond to the center portions of the short sides facing each other in the outer peripheral edge of the forming region S of the planar coil portion 23. The protrusion region 14g and the protrusion region 14h are line-symmetric in regard to the axis of symmetry passing through the center Sp of the forming region S of the planar coil portion 23. The protrusion region 14i and the protrusion region 14j are positioned in such a manner as to respectively correspond to the center portions of the long sides facing each other in the outer peripheral edge of the forming region S of the planar coil portion 23. The protrusion region 14i and the protrusion region 14j are line-symmetric in regard to the axis of symmetry passing through the center Sp of the forming region S of the planar coil portion 23. Accordingly, in the present embodiment as well, the protrusion regions 14g to 14j of the insulative resin layer 14 are symmetrical in shape in regard to the center Sp of the forming region S of the planar coil portion 23.

As illustrated in FIG. 14, the protrusion region 15b in the insulative resin layer 15 on the outer peripheral side includes protrusion regions 15g, 15h, 15i, and 15j positioned in such a manner as to respectively correspond to the long sides and the short sides in the outer peripheral edges of the forming regions S of the planar coil portions 23 and 24. For example, the widths of the protrusion regions 15g to 15j (lengths along the long sides and the short sides in the outer peripheral edge of the forming region S) are approximately ⅓ times each of the long sides and each of the short sides in the outer peripheral edges of the forming regions S of the planar coil portions 23 and 24.

The protrusion region 15g and the protrusion region 15h are positioned in such a manner as to respectively correspond to the center portions of the short sides facing each other in the outer peripheral edges of the forming regions S of the planar coil portions 23 and 24. The protrusion region 15g and the protrusion region 15h are line-symmetric in regard to the axis of symmetry passing through the centers Sp of the forming regions S of the planar coil portions 23 and 24. The protrusion region 15$i$ and the protrusion region 15$j$ are positioned in such a manner as to respectively correspond to the center portions of the long sides facing each other in the outer peripheral edges of the forming regions S of the planar coil portions 23 and 24. The protrusion region 15$i$ and the protrusion region 15$j$ are line-symmetric in regard to the axis of symmetry passing through the centers Sp of the forming regions S of the planar coil portions 23 and 24. Accordingly, in the present embodiment as well, the protrusion regions 15$g$ to 15$h$ of the insulative resin layer 15 are symmetrical in shape in regard to the centers Sp of the forming regions S of the planar coil portions 23 and 24.

As illustrated in FIG. 15, the protrusion region 16$b$ in the insulative resin layer 16 on the outer peripheral side includes protruding protrusion regions 16$g$, 16$h$, 16$i$, and 16$j$ positioned in such a manner as to respectively correspond to the long sides and the short sides in the outer peripheral edge of the forming region S of the planar coil portion 24. For example, the widths of the protrusion regions 16$g$ to 16$j$ (lengths along the long sides and the short sides in the outer peripheral edge of the forming region S) are approximately ⅓ times each of the long sides and each of the short sides in the outer peripheral edge of the forming region S of the planar coil portion 24.

The protrusion region 16$g$ and the protrusion region 16$h$ are positioned in such a manner as to respectively correspond to the center portions of the short sides facing each other in the outer peripheral edge of the forming region S of the planar coil portion 24. The protrusion region 16$g$ and the protrusion region 16$h$ are line-symmetric in regard to the axis of symmetry passing through the center Sp of the forming region S of the planar coil portion 24. The protrusion region 16$i$ and the protrusion region 16$j$ are positioned in such a manner as to respectively correspond to the center portions of the long sides facing each other in the outer peripheral edge of the forming region S of the planar coil portion 24. The protrusion region 16$i$ and the protrusion region 16$j$ are line-symmetric in regard to the axis of symmetry passing through the center Sp of the forming region S of the planar coil portion 24. Accordingly, in the present embodiment as well, the protrusion regions 16$g$ to 16$j$ of the insulative resin layer 16 are symmetrical in shape in regard to the center Sp of the forming region S of the planar coil portion 24.

As described above, in the coil component according to the aspect illustrated in FIGS. 12 to 15 as well, similar to the embodiment, positional deviation of the coil portion 25 caused within the covering portion 7 due to thermal history, vibration, or the like can be prevented. As a result, a change in inductance can be prevented. In addition, in the coil component according to this aspect as well, the protrusion regions 14$b$ to 16$b$ are symmetrically formed based on the centers Sp of the symmetrically-shaped forming regions S of the planar coil portions 23 and 24. Therefore, bias of stress caused within the covering portion 7 due to thermal history, vibration, or the like is equalized. Accordingly, positional stability of the coil portion 25 within the covering portion 7 is further improved.

Next, with reference to FIG. 16, a coil component according to further another aspect different from the coil component 10 described above will be described. FIG. 16 is a sectional view corresponding to FIG. 4 of the coil component 10 described above.

In a coil component 10A according to the aspect illustrated in FIG. 16, the shapes of the insulative resin layers 14 to 16 are different from those of the embodiment described above. Specifically, in the coil component 10A, the insulative resin layers 15 and 16 have no protrusion regions 15$c$ and 16$c$ on the inner peripheral side.

In the coil component 10A according to the aspect illustrated in FIG. 16 as well, similar to the embodiment described above, adhesion of the insulative resin layers 14 to 16 with respect to the covering portion 7 is further improved. Therefore, positional stability of the coil portion 25 within the covering portion 7 is further improved.

EXAMPLE

Hereinafter, in order to describe the effect thereof, Examples executed by the inventors will be described. The present invention is not limited to the following Examples. In the following Comparative Examples and Examples, 100 coil components were prepared. Each of the coil components included a coil portion that had a ring-shaped planar coil portion including a coil-wound portion and an intra insulative layer which covered the periphery of the coil-wound portion within the same layer as the coil-wound portion, and an extra insulative layer overlapping the planar coil portion; and a covering portion that covered the coil portion. The average value of the initial inductance of the coil components was 950 nH.

First, in the following Comparative Example 1 and Examples 1 to 4, thermal history was applied to the coil components by alternately repeating cooling at −20° C. for 5 minutes and heating at 40° C. for 5 minutes 100 times.

Comparative Example 1

In Comparative Example 1, the change amount in inductance was measured by using a coil component in which the extra insulative layer overlapping the planar coil portion had only the superimposing region overlapping the forming region of the planar coil portion, and none of the inner peripheral edge and the outer peripheral edge of the superimposing region had the protrusion region when viewed in the direction of overlapping the planar coil portion.

Examples 1 to 3

In Examples 1 to 3, the change amount in inductance was measured by using a coil component in which the extra insulative layer overlapping the planar coil portion had the superimposing region overlapping the forming region of the planar coil portion, the protrusion region protruding from the inner peripheral edge of the superimposing region in its entirety, and the protrusion region protruding from the outer peripheral edge of the superimposing region in its entirety when viewed in the direction of overlapping the planar coil portion. The length of the protrusion (depth) of the protrusion region on the inner peripheral edge side and the outer peripheral edge side was set to 5 μm in Example 1, 10 μm in Example 2, and 30 μm in Example 3.

Example 4

In Example 4, the change amount in inductance was measured by using a coil component in which the extra insulative layer overlapping the planar coil portion had the superimposing region overlapping the forming region of the planar coil portion, the protrusion region protruding from the inner peripheral edge of the superimposing region in its entirety, and the protrusion region partially protruding from the outer peripheral edge of the superimposing region when viewed in the direction of overlapping the planar coil portion. The length of the protrusion of the protrusion region on the inner peripheral edge side was set to 10 μm, and the length of the protrusion of the protrusion region on the outer peripheral edge side was set to 10 μmm. The width of the protrusion region on the outer peripheral edge side (lengths along the long side and the short side in the outer peripheral edge of the forming region of the planar coil portion) was set to approximately ⅓ times each of the long sides and each of the short sides in the outer peripheral edge of the forming region of the planar coil portion.

Result

Table 1 indicates the measurement results of Comparative Example 1 and Examples 1 to 4. Table 1 indicates the average value of the measurement results of the 100 prepared coil components.

TABLE 1

|  | Change amount in inductance (%) |
|---|---|
| Comparative Example 1 | 16.0 |
| Example 1 | 1.8 |
| Example 2 | 0.0 |
| Example 3 | 0.0 |
| Example 4 | 2.4 |

As indicated in Table 1, in a case of Comparative Example 1, the change amount in inductance was 16.0%. In contrast, in cases of Examples 1 to 4, all of the change amounts in inductance decreased compared to a case of Comparative Example 1. That is, in cases of Examples 1 to 4, it was found that a change in inductance caused due to the thermal history could be prevented.

Next, in the following Comparative Example 2 and Examples 5 to 8, a coil component was placed on nonwoven fabric under water, and ultrasound waves were applied at 40 kHz and 100 W for 10 minutes.

Comparative Example 2

In Comparative Example 2, the change amount in inductance was measured by using a coil component similar to that of Comparative Example 1.

Examples 5 to 7

In Examples 5 to 7, the change amount in inductance was measured by using a coil component similar to those of Examples 1 to 3.

Example 8

In Example 8, the change amount in inductance was measured by using a coil component similar to that of Example 4.

Result

Table 2 indicates the measurement results of Comparative Example 2 and Examples 5 to 8. Table 2 indicates the average value of the measurement results of the 100 prepared coil components.

TABLE 2

|  | Change amount in inductance (%) |
|---|---|
| Comparative Example 2 | 21.0 |
| Example 5 | 1.8 |
| Example 6 | 0.0 |
| Example 7 | 0.0 |
| Example 8 | 3.1 |

As indicated in Table 2, in a case of Comparative Example 2, the change amount in inductance was 21.0%. In contrast, in cases of Examples 5 to 8, all of the change amounts in inductance decreased compared to a case of Comparative Example 2. That is, in cases of Examples 5 to 8, it was found that a change in inductance caused due to vibration of the ultrasound waves could be prevented.

Hereinbefore, the embodiment of the present invention has been described. However, the present invention may be modified or may be applied to a different aspect in the scope without changing the gist disclosed in each of the aspects of the invention.

The shapes of the insulative resin layers 14 to 16 are not limited to the embodiment described above. For example, the protrusion regions of the insulative resin layers 14 to 16 are acceptable as long as the protrusion regions protrude from at least any one of the inner peripheral edge and the outer peripheral edge of the superimposing regions 14a to 16a. In addition, for example, the protrusion regions partially protruding from the outer peripheral side in the insulative resin layers 14 to 16 may be positioned while deviating from the center portion, instead of being positioned in such a manner as to correspond to the center portions of the long sides and the short sides in the outer peripheral edges of the forming regions S of the planar coil portions 23 and 24. In addition, the protrusion regions 15c and 16c in the insulative resin layers 15 and 16 may not protrude from the inner peripheral edges of the superimposing regions 15a and 16a in its entirety, and may partially protrude from the inner peripheral edges of the superimposing regions 15a and 16a.

An extra insulative layer which has only the protrusion region protruding from the inner peripheral edge of the superimposing region, and an extra insulative layer which has only the protrusion region protruding from the outer peripheral edge of the superimposing region may be mixed and present within one coil component. In addition, an extra insulative layer which has the protrusion region protruding from the inner peripheral edge of the superimposing region in its entirety, and an extra insulative layer which has the protrusion region partially protruding from the inner peripheral edge may be mixed and present within one coil component. An extra insulative layer which has the protrusion region protruding from the outer peripheral edge of the superimposing region in its entirety, and an extra insulative layer which has the protrusion region partially protruding from the outer peripheral edge may be mixed and present within one coil component.

In the embodiment, the forming regions S of the planar coil portions 23 and 24 completely coincide with each other. However, the embodiment is not limited thereto. The planar coil portion 23 and the planar coil portion 24 may be different from each other in dimensions, position, or the like of the forming region S. In addition, for example, in a case where the forming regions S of the planar coil portions 23 and 24 do not completely coincide with each other, the protrusion region may protrude with respect to any one of the forming regions S of the planar coil portion 23 and the planar coil portion 24.

In addition, in the embodiment, all of the insulative resin layers 14 to 16, that is, all of the extra insulative layers have the superimposing region and the protrusion region. However, the embodiment is not limited thereto. In the extra insulative layers, a part of the extra insulative layers may have the superimposing region and the protrusion region, and the remaining extra insulative layers may have the superimposing region and no protrusion region. In this case, the protrusion region is selectively provided in only an extra insulative layer of which adhesion with respect to the covering portion is desired to be improved.

Moreover, in three layers of the insulative resin layers 14 to 16, the insulative resin layer 16 farthest from the magnetic substrate 11 may have the superimposing region and the protrusion region. The insulative resin layer 16 farthest from the magnetic substrate 11 is likely to positionally deviate due to thermal history, vibration, or the like, compared to the insulative resin layers 14 and 15 closer to the magnetic substrate 11. The positional deviation of the insulative resin layer 16 farthest from the magnetic substrate 11 is prevented by providing the protrusion region in the insulative resin layer 16. Accordingly, positional stability of the coil portion within the covering portion is effectively improved. In addition, for example, in the three layers of the insulative resin layers 14 to 16 an insulative resin layer farther from the magnetic substrate 11 may be longer in length of the protrusion of the protrusion region.

In the embodiment, two layers of the planar coil portions 23 and 24 are provided. However, the embodiment is not limited thereto. For example, one layer, three layers, or more of the planar coil portions may be provided.

In the aspect of the embodiment, the insulative layer 30 is provided in such a manner as to cover the main surface 7a of the covering portion 7 in its entirety. However, the embodiment is not limited thereto. The insulative layer 30 may be provided in at least a part between the pair of terminal electrodes 20A and 20B on the main surface 7a. For example, the insulative layer 30 may have a shape which extends in a direction intersecting the long-side direction of the main surface 7a (direction in which the pair of terminal electrodes 20A and 20B is adjacent to each other) and traverses the main surface 7a.

In the embodiment, the terminal electrodes 20A and 20B are provided on the insulative layer 30. However, the embodiment is not limited thereto. For example, through holes having the dimensions and the shape corresponding to the forming regions of the terminal electrodes 20A and 20B may be provided in the insulative layer 30, and the terminal electrodes 20A and 20B may be directly provided on the main surface 7a of the covering portion 7.

In the aspect of the embodiment, the terminal electrodes 20A and 20B and the conductor portions 31 and 32 are formed at one time. However, the terminal electrodes 20A and 20B and the conductor portions 31 and 32 may be separately formed. In this case, the configuration material of the terminal electrodes 20A and 20B and the configuration material of the conductor portions 31 and 32 may be different from each other.

What is claimed is:

1. A coil component comprising:
a coil portion that has (1) at least one layer of a planar coil portion including (a) a conductive coil-wound portion having spaced windings and a periphery and (b) an intra insulative resin layer which covers the periphery of the conductive coil-wound portion within the same layer as the conductive coil-wound portion and fills spaces between the spaced windings and (2) an extra insulative layer overlapping the planar coil portion; and
a covering portion that covers the coil portion, wherein:
the extra insulative layer (1) has a superimposing region that overlaps the at least one layer of a planar coil portion and a protrusion region (a) protruding from at least any one of an inner peripheral edge and an outer peripheral edge of the superimposing region and (b) that does not overlap the at least one layer of a planar coil portion when viewed in a direction of overlapping the planar coil portion and (2) is in direct contact with the planar coil portion;
the intra insulative resin layer does not overlap the coil-wound portion when viewed in the direction of overlapping the planar coil; and
the protrusion region extends into and is embedded in the covering portion.

2. The coil component according to claim 1,
wherein when viewed in the direction of overlapping the planar coil portion, outer peripheries of the superimposing region and the protrusion region have a same shape.

3. The coil component according to claim 1,
wherein when viewed in the direction of overlapping the planar coil portion, the protrusion region protrudes from the inner peripheral edge of the superimposing region in its entirety.

4. The coil component according to claim 1,
wherein when viewed in the direction of overlapping the planar coil portion, the protrusion region protruding from the outer peripheral edge of the superimposing region in its entirety.

5. The coil component according to claim 1,
wherein the coil portion has a plurality layers of the planar coil portions and a plurality layers of the extra insulative layers respectively overlapping the planar coil portions, and
wherein in the plurality layers of extra insulative layers, a part of the extra insulative layers has the superimposing region and the protrusion region, and the remaining extra insulative layers have the superimposing region and no protrusion region.

6. The coil component according to claim 5,
wherein the covering portion has a substrate in which the coil portion is formed, and
wherein in the plurality layers of extra insulative layers, the extra insulative layer farthest from the substrate has the superimposing region and the protrusion region.

7. The coil component according to claim 1,
wherein the coil portion has a plurality layers of the planar coil portions and a plurality layers of the extra insulative layers respectively overlapping the planar coil portions, and
wherein all of the plurality layers of extra insulative layers have the superimposing region and the protrusion region.

8. A power supply circuit unit comprising:
the coil component according to claim 1.

9. A coil component comprising:
a coil portion that has (1) at least one layer of a planar coil portion including (a) a conductive coil-wound portion having spaced windings and a periphery and (b) an intra insulative layer which covers the periphery of the conductive coil-wound portion within the same layer as the conductive coil-wound portion and fills spaces between the spaced windings and (2) an extra insulative layer overlapping the planar coil portion; and a covering portion that covers the coil portion, wherein:

the extra insulative layer (1) extends beyond an outer periphery of the planar coil portion when viewed in a direction of overlapping the planar coil portion and (2) is in direct contact with the planar coil portion;

the intra insulative resin layer does not overlap the coil-wound portion when viewed in the direction of overlapping the planar coil; and the protrusion region extends into and is embedded in the covering portion.

10. The coil component according to claim 9, wherein when viewed in the direction of overlapping the planar coil portion, an area of the extra insulative layer that extends beyond the periphery of the planar coil portion is symmetrical in shape.

11. The coil component according to claim 9, wherein:

the planar coil portion has an outer periphery; and when viewed in the direction of overlapping the planar coil portion, the extra insulative layer extends beyond the entire outer periphery of the planar coil portion.

12. The coil component according to claim 9, wherein the planar coil portion has an inner periphery; and when viewed in the direction of overlapping the planar coil portion, the extra insulative layer extends beyond the entire inner periphery of the planar coil portion.

13. The coil component according to claim 1, wherein the extra insulative layer is comprised of a different material than the intra insulative resin layer.

14. The coil component according to claim 1, wherein the protrusion region contacts and adheres to the covering portion.

15. The coil component according to claim 14, wherein the protrusion region is configured such that adhesion between the protrusion region and the covering portion contributes to the stability of the coil component.

* * * * *